US012803886B2

(12) United States Patent
Chen

(10) Patent No.: US 12,803,886 B2
(45) Date of Patent: Nov. 17, 2026

(54) METHOD, APPARATUS, AND DEVICE FOR DISPLAYING TOPOLOGICAL STRUCTURE DIAGRAM, AND STORAGE MEDIUM

(71) Applicant: HUAWEI TECHNOLOGIES CO., LTD., Shenzhen (CN)

(72) Inventor: Lujing Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/556,054

(22) Filed: Dec. 20, 2021

(65) Prior Publication Data

US 2022/0150136 A1 May 12, 2022

Related U.S. Application Data

(63) Continuation of application No. PCT/CN2020/096665, filed on Jun. 17, 2020.

(30) Foreign Application Priority Data

Jun. 20, 2019 (CN) ......................... 201910538595.9
Jul. 23, 2019 (CN) ......................... 201910668472.7

(51) Int. Cl.
*H04L 41/22* (2022.01)
*G06F 3/0482* (2013.01)
(Continued)

(52) U.S. Cl.
CPC ............ *H04L 41/22* (2013.01); *G06F 3/0482* (2013.01); *G06F 3/0483* (2013.01); *G06F 9/451* (2018.02);
(Continued)

(58) Field of Classification Search
CPC ......... H04L 41/22; H04L 41/12; G06F 9/451; G06F 16/287; G06F 3/0482; G06F 3/0483; G06F 2203/04803; G06T 11/206
See application file for complete search history.

(56) References Cited

U.S. PATENT DOCUMENTS 6,628,304 B2 9/2003 Mitchell et al.
7,290,222 B2 * 10/2007 Guido .................. G06F 16/904 707/E17.142
(Continued)

FOREIGN PATENT DOCUMENTS

CN 101834735 A 9/2010
CN 103106197 A 5/2013
(Continued)

OTHER PUBLICATIONS van Ravensteijn, W.J.P., Visual traceability across dynamic ordered hierachies, Dec. 31, 2011, total 44 pages.

*Primary Examiner* — Stephen Hong
*Assistant Examiner* — Darrin Hope
(74) *Attorney, Agent, or Firm* — Rimon PC

(57) ABSTRACT

A method, apparatus, and device for displaying a topological structure diagram, and a storage medium are disclosed, and belong to the field of network technologies. The method includes: obtaining topology information of the topological structure diagram; classifying the topology information based on node types in the topological structure diagram; and displaying the topological structure diagram in a display interface based on a classification result. The topology information is classified, and the topological structure diagram is displayed based on the classification result. In this way, displayed content is organized and more orderly, operability and usability are improved, and user experience can
(Continued)

be improved. In addition, rendering is facilitated, memory and time are saved, and page freezing is avoided.

16 Claims, 26 Drawing Sheets

(51) Int. Cl.

| | |
|---|---|
| ***G06F 3/0483*** | (2013.01) |
| ***G06F 9/451*** | (2018.01) |
| ***G06F 16/28*** | (2019.01) |
| ***G06T 11/20*** | (2026.01) |
| ***G06T 11/26*** | (2026.01) |
| ***H04L 41/12*** | (2022.01) |

(52) U.S. Cl.
CPC ............ *G06F 16/287* (2019.01); *G06T 11/26* (2026.01); *H04L 41/12* (2013.01); *G06F 2203/04803* (2013.01)

(56) References Cited

U.S. PATENT DOCUMENTS

| | | | | |
|---|---|---|---|---|
| 7,315,985 | B1 | 1/2008 | Gauvin et al. | |
| 8,850,362 | B1 * | 9/2014 | Khoshnevisan | G06F 16/951 715/853 |
| 2002/0147809 | A1 * | 10/2002 | Vinberg | H04L 41/046 709/224 |
| 2003/0035005 | A1 | 2/2003 | Kodosky et al. | |
| 2004/0085347 | A1 * | 5/2004 | Hagarty, Jr. | H04L 41/12 715/735 |
| 2009/0171629 | A1 * | 7/2009 | Hirose | H04L 41/12 715/765 |
| 2012/0036484 | A1 * | 2/2012 | Zhang | H04L 41/12 715/853 |
| 2016/0357416 | A1 * | 12/2016 | Abuduweili | G06F 3/0482 |
| 2017/0060348 | A1 * | 3/2017 | Kongot | G06T 11/206 |
| 2017/0299645 | A1 * | 10/2017 | Wang | G06F 11/3051 |
| 2018/0329794 | A1 * | 11/2018 | Prieto | G06F 11/3006 |

FOREIGN PATENT DOCUMENTS

| | | | |
|---|---|---|---|
| CN | 107332707 | A | 11/2017 |
| CN | 107453911 | A | 12/2017 |
| CN | 107682199 | A | 2/2018 |
| CN | 108696380 | A | 10/2018 |
| WO | 2008022056 | A2 | 2/2008 |

* cited by examiner

METHOD, APPARATUS, AND DEVICE FOR DISPLAYING TOPOLOGICAL STRUCTURE DIAGRAM, AND STORAGE MEDIUM

CROSS-REFERENCE TO RELATED APPLICATIONS

This application is a continuation of International Application No. PCT/CN2020/096665, filed on Jun. 17, 2020, which claims priority to Chinese Patent Application No. 201910538595.9 filed on Jun. 20, 2019, and Chinese Patent Application No. 201910668472.7 filed on Jul. 23, 2019. All of the aforementioned patent applications are hereby incorporated by reference in their entireties.

TECHNICAL FIELD

This application relates to the field of graphical interface technologies, and in particular, to a displaying method, apparatus, and device for displaying a topological structure diagram, and a storage medium.

BACKGROUND

As a graphical interface is widely used, there are more and more application scenarios in which topological structure diagrams are displayed in the graphical interface. A topological structure diagram is a network structure diagram including a network node device and a communications medium, and is also referred to as a topology diagram below.

In the related technology, a topology diagram includes all network device nodes in a data center, and connection relationships between all the nodes are established, and the complete topology diagram is displayed on a browser in a hypertext markup language (HTML) manner.

However, when there are a relatively large quantity of network devices, the complete topology diagram has a complex and disordered structure, discursive information, and poor operability and usability. In addition, more memory and time are required for a browser to render a complex topology diagram. Consequently, page freezing is a frequent problem.

SUMMARY

Embodiments of this application provide a method, apparatus, and device for displaying a topological structure diagram, and a storage medium, to resolve a problem in the related technology. Technical solutions are as follows:

According to an aspect, a method for displaying a topological structure diagram is provided. The method includes: obtaining topology information of the topological structure diagram; classifying the topology information based on node types in the topological structure diagram; and displaying the topological structure diagram in a display interface based on a classification result.

The topology information is classified, and the topological structure diagram is displayed based on the classification result. In this way, displayed content is organized and more orderly, operability and usability are improved, and user experience can be improved. In addition, rendering is facilitated, memory and time are saved, and page freezing is avoided.

In an example embodiment, displaying the topological structure diagram in a display interface based on a classification result includes: displaying a reference-quantity-layer topology structure in the display interface based on the classification result, and when any node in the (reference-quantity)$^{th}$ layer of topology structure is selected, continuing to display a lower layer of topology structure of the selected node. For example, a reference quantity may be set based on experience or an application scenario, or may be determined based on the node types.

The reference-quantity-layer topology structure is displayed in the display interface, and when any node in the (reference-quantity)$^{th}$ layer of topology structure is selected, the lower layer of topology structure of the selected node continues to be displayed. A topology structure is subsequently displayed when there is a displaying requirement. In this way, the displaying requirement is met, the topology structure displayed in the display interface is more orderly, memory and time are further saved, and page smoothness is improved.

In an example embodiment, the display interface includes a first display area and a second display area; a node used to construct a network topology diagram and a diagram element corresponding to a communications medium are displayed in the first display area; and displaying a reference-quantity-layer topology structure in the display interface based on the classification result, and when any node in the (reference-quantity)$^{th}$ layer of topology structure is selected, continuing to display a lower layer of topology structure of the selected node includes: displaying the reference-quantity-layer topology structure in the second display area based on the classification result, and when any node in the (reference-quantity)$^{th}$ layer of topology structure is selected, continuing to display the lower layer of topology structure of the selected node; and when any diagram element in the first display area is selected, updating, based on the selected diagram element, the topology structure displayed in the second display area. The topology structure is updated based on the diagram element in the first display area, and therefore a topology structure displaying function is extended.

In an example embodiment, the display interface includes a first display area and a second display area; and displaying the topological structure diagram in a display interface based on a classification result includes: displaying, in the first display area, diagram elements corresponding to different types of nodes in the topological structure diagram; and after any diagram element in the first display area is selected, displaying, in the second display area based on a hierarchical relationship, a topology structure corresponding to a node type corresponding to the selected diagram element.

In an example embodiment, displaying, in the second display area based on a hierarchical relationship, a topology structure corresponding to a node type corresponding to the selected diagram element includes: displaying, in the second display area based on the hierarchical relationship, the first layer of topology structure corresponding to a same type of node corresponding to the selected diagram element; and after any node in the first layer of topology structure is selected, continuing to display a lower layer of topology structure of the selected node.

The diagram elements corresponding to the different types of nodes in the topological structure diagram are displayed in the first display area, and after any diagram element in the first display area is selected, a lower layer of topology structure of a selected node continues to be displayed based on a hierarchical relationship. A topology structure is subsequently displayed when there is a displaying requirement. In this way, the displaying requirement is met, the topology structure displayed in the display interface is more orderly, memory and time are further saved, and page smoothness is improved.

In an example embodiment, continuing to display a lower layer of topology structure of the selected node includes: displaying the lower layer of topology structure of the selected node in a manner different from a manner for an unselected node. This highlights the lower layer of topology structure of the selected node.

In an example embodiment, in a process of continuing to display the lower layer of topology structure of the selected node, the method further includes: hiding a diagram element other than the selected node and an upper layer and a lower layer of topology structures of the selected node.

The diagram element other than the selected node and the upper layer and the lower layer of topology structures of the selected node is hidden, and only the upper layer and the lower layer of topology structures of the selected node are displayed. In this way, fewer icons are displayed, and networking information of a single node can be quickly and effectively viewed.

In an example embodiment, continuing to display a lower layer of topology structure of the selected node in the second display area includes: when a quantity of nodes in the lower layer of topology structure of the selected node is greater than a reference quantity, displaying the lower layer of topology structure of the selected node in the second display area in a pagination manner, and displaying a page switching control in the display interface; and switching a page by using the page switching control, where different pages display different nodes in the lower layer of structure of the selected node.

The lower layer of topology structure of the selected node is displayed in the pagination manner. When there is a large quantity of nodes, the displayed diagram elements are organized. During rendering, required memory and time can be further reduced, and page freezing can be reduced. In addition, the page switch control can be used to switch the page, and therefore a viewing requirement is met.

In an example embodiment, before hiding the diagram element other than the selected node and the upper layer and the lower layer of topology structures of the selected node, the method further includes: displaying a control menu, where the control menu displays an option used to indicate to display a diagram element related to the selected node; and hiding the diagram element other than the selected node and the upper layer and the lower layer of topology structures of the selected node by using the option that is in the control menu and that is used to indicate to display the diagram element related to the selected node.

In an example embodiment, the display interface further displays a search box; and after displaying the topological structure diagram in a display interface based on a classification result, the method further includes: obtaining node information entered in the search box; and displaying, in the display interface, a topology structure in which a node corresponding to the node information is located.

The search box is used to locate a searched node. In this way, cross-page search and dynamic page switching can be implemented, and a diagram element of a found node can be effectively located and viewed.

In an example embodiment, the displaying the topological structure diagram in a display interface based on a classification result includes: when a quantity of nodes in any layer of topology structure is greater than a quantity threshold, displaying the nodes in any layer of topology structure in an aggregation manner.

In an example embodiment, after displaying the nodes in any layer of topology structure in an aggregation manner, the method further includes: displaying information about aggregated nodes in the any layer of topology structure in a list form.

When the quantity of nodes in any layer of topology structure is greater than the quantity threshold, if the aggregation manner is used, a quantity of diagram elements that need to be displayed can be reduced, and rendering pressure can be reduced. Then, the information about the aggregated nodes is displayed in the list form. In this way, an information viewing requirement is further met.

In an example embodiment, after displaying the topological structure diagram in a display interface based on a classification result, the method further includes: displaying a thumbnail of the topological structure diagram.

The thumbnail is used to display the entire topological structure diagram. When there is a large amount of data, a user can effectively see a full view of the entire topology. Therefore, information searching is facilitated.

In an example embodiment, the method further includes: displaying a setting interface in the display interface, where the setting interface is used to set personalized settings for a diagram element displayed in the display interface.

In an example embodiment, the personalized settings include a diagram element spacing, a text length, and a text inclination.

The personalized setting can enable the displayed topological structure diagram to meet a personalized requirement better.

An apparatus for displaying a topological structure diagram is further provided. The apparatus includes:

- an obtaining module, configured to obtain topology information of the topological structure diagram;
- a classification module, configured to classify the topology information based on node types in the topological structure diagram; and
- a display module, configured to display the topological structure diagram in a display interface based on a classification result.

In an example embodiment, the display module is configured to: display a reference-quantity-layer topology structure in the display interface based on the classification result, and when any node in the (reference-quantity)$^{th}$ layer of topology structure is selected, continue to display a lower layer of topology structure of the selected node.

In an example embodiment, the display interface includes a first display area and a second display area; and a node used to construct a network topology diagram and a diagram element corresponding to a communications medium are displayed in the first display area.

The display module is configured to: display the reference-quantity-layer topology structure in the second display area based on the classification result, and when any node in the (reference-quantity)$^{th}$ layer of topology structure is selected, continue to display the lower layer of topology structure of the selected node; and when any diagram element in the first display area is selected, update, based on the selected diagram element, a topology structure displayed in the second display area.

In an example embodiment, the display interface includes a first display area and a second display area.

The display module is configured to: display, in the first display area, diagram elements corresponding to different types of nodes in the topological structure diagram; and after any diagram element in the first display area is selected, display, in the second display area based on a hierarchical relationship, a topology structure corresponding to a node type corresponding to the selected diagram element.

In an example embodiment, the display module is configured to: display, in the second display area based on the hierarchical relationship, the first layer of topology structure corresponding to a same type of node corresponding to the selected diagram element; and after any node in the first layer of topology structure is selected, continue to display a lower layer of topology structure of the selected node in the second display area.

In an example embodiment, the display module is configured to display the lower layer of topology structure of the selected node in a manner different from a manner for an unselected node.

In an example embodiment, the display module is further configured to hide a diagram element other than the selected node and an upper layer and a lower layer of topology structures of the selected node.

In an example embodiment, the display module is configured to: when a quantity of nodes in the lower layer of topology structure of the selected node is greater than a reference quantity, display the lower layer of topology structure of the selected node in the second display area in a pagination manner, and display a page switching control in the display interface; and switch a page by using the page switching control, where different pages display different nodes in the lower layer of structure of the selected node.

In an example embodiment, the display module is further configured to: display a control menu in the second display area, where the control menu displays an option used to indicate to display a diagram element related to the selected node; and hide the diagram element other than the selected node and the upper layer and the lower layer of topology structures of the selected node by using the option that is in the control menu and that is used to indicate to display the diagram element related to the selected node.

In an example embodiment, the display interface further displays a search box; and the display module is further configured to: obtain node information entered in the search box; and display, in the display interface, a topology structure in which a node corresponding to the node information is located.

In an example embodiment, the display module is further configured to: when a quantity of nodes in any layer of topology structure is greater than a quantity threshold, display the nodes in the any layer of topology structure in an aggregation manner.

In an example embodiment, the display module is further configured to display information about aggregated nodes in any layer of topology structure in a list form.

In an example embodiment, the display module is configured to: display the topological structure diagram in the display interface based on the classification result, and display a thumbnail of the topological structure diagram.

In an example embodiment, the display module is further configured to display a setting interface in the display interface, where the setting interface is used to set personalized settings for a diagram element displayed in the display interface.

In an example embodiment, the personalized settings include a diagram element spacing, a text length, and a text inclination.

A device for displaying a topological structure diagram is further provided. The device includes a memory and a processor. The memory stores at least one instruction. The at least one instruction is loaded and executed by the processor, to implement the method for displaying a topological structure diagram according to any one of the foregoing example embodiments.

A computer-readable storage medium is further provided. The storage medium stores at least one instruction. The instruction is loaded and executed by a processor, to implement the method for displaying a topological structure diagram according to any one of the foregoing example embodiments.

Another communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method according to any one of the foregoing example implementations.

In an example embodiment, there are one or more processors, and there are one or more memories.

In an example embodiment, the memory may be integrated with the processor, or the memory and the processor are disposed separately.

In a specific implementation process, the memory may be a non-transitory memory, such as a read-only memory (ROM). The memory and the processor may be integrated into one chip, or may be disposed in different chips. A type of the memory and a manner of disposing the memory and the processor are not limited in this embodiment of this application.

A computer program (product) is provided. The computer program includes computer program code. When the computer program code is run on a computer, the computer is enabled to perform the method according to any one of the foregoing example embodiments.

A chip is provided. The chip includes a processor. The processor is configured to invoke and run instructions stored in a memory, to enable a communications device on which the chip is installed to perform the method according to any one of the foregoing example embodiments.

Another chip is provided, including an input interface, an output interface, a processor, and a memory. The input interface, the output interface, the processor, and the memory are connected to each other through an internal connection channel. The processor is configured to execute code in the memory. When the code is executed, the processor is configured to perform the method according to any one of the foregoing example embodiments.

The technical solutions provided in this application have at least the following beneficial effects:

The topology information is classified, and the topological structure diagram is displayed based on the classification result. In this way, displayed content is organized and more orderly, operability and usability are improved, and user experience can be improved. In addition, rendering is facilitated, memory and time are saved, and page freezing is avoided.

DESCRIPTION OF EMBODIMENTS

Terms used in this application are merely intended to explain specific embodiments of this application, and are not intended to limit this application.

As a graphical interface is widely used, a topological structure diagram including all nodes of a network device in a data center and connection relationships between all the nodes is established, and the topological structure diagram is displayed in a user visualization interface in an HTML manner or another manner, so that information is intuitively displayed. This can help operation and maintenance personnel intuitively learn of a running status of a device represented by a node, and facilitate management, and operation and maintenance.

The topological structure diagram is a network structure diagram including a network node device and a communications medium, and defines connection manners of various computers, printers, network devices, and other devices. If there are a relatively large quantity of network node devices, the topological structure diagram is complex. If the entire topological structure diagram is directly displayed, pages are displayed disorderly, operability and usability are poor, and user experience is greatly affected.

In view of this, an embodiment of this application provides a method for displaying a topological structure diagram. In the method, after topology information of the topological structure diagram is obtained, the topology information is first classified, and the topological structure diagram is displayed based on a classification structure. In this way, the topological structure diagram can be displayed in order, and operability and usability can be improved. For example, an implementation environment of the method may include a terminal and a server. A browser used to display the topological structure diagram is installed on the terminal. There may be a wired or wireless communication connection between the terminal and the server. After the communication connection is established, the terminal requests to obtain the topology information of the to-be-displayed topological structure diagram from the server. Then, the browser displays the topological structure diagram according to the method provided in this embodiment of this application.

Figure 1:
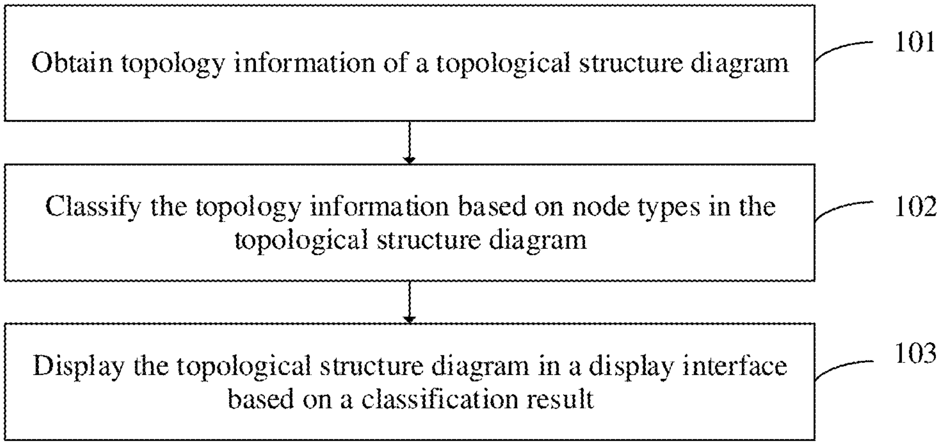
FIG. 1 is a flowchart of a method for displaying a topological structure diagram according to an embodiment of this application.

The method for displaying a topological structure diagram provided in this embodiment of this application is shown in FIG. 1. For example, the method is applied to the browser on the terminal, and includes the following content.

Operation 101: Obtain topology information of the topological structure diagram.

When there is a requirement for displaying or querying the topological structure diagram, the terminal may request, from the server, the topology information of the topological structure diagram that needs to be displayed. For example, the topology information includes but is not limited to information about each node and connection information in the topological structure diagram. Nodes in the topological structure diagram may be various data processing devices, data communication control devices, and data terminal devices in a network system, for example, a logical router and a logical switch. In this embodiment of this application, the nodes further include an external network domain, a logical value added service (VAS), an interconnection interface, a logical port, a user port, and the like. The information about the node includes but is not limited to a name of the node, a type, a hierarchical relationship of the node, and the like. The type of the node is used to indicate which type the node belongs to, for example, whether the node belongs to a logical router or a logical switch. For any node, a hierarchical relationship of the any node may be used to indicate a node to which the any node belongs and a lower-layer node that belongs to the any node. The connection information includes but is not limited to a connection manner, a connection link, and the like between nodes.

Operation 102: Classify the topology information based on node types in the topological structure diagram.

The topological structure diagram includes a relatively large quantity of nodes, and some nodes are of the same type. Therefore, according to the method provided in this embodiment of this application, the entire topological structure diagram is not directly displayed based on the topology information, but the topology information is classified based on the node types. Then, the topological structure diagram may be displayed by category based on a displaying requirement or a query requirement. In this way, the topological structure diagram is displayed more orderly and intuitively.

When the topology information is classified based on the node types in the topological structure diagram, if the topology information of the topological structure diagram includes type information of the nodes, nodes with the same type information may be classified into one category. For example, the topological structure diagram includes several types such as an external network domain, a logical VAS, an interconnection interface, a logical router, a logical switch, a logical port, and a user port.

In an example implementation, when the topology information is classified based on the node types, in addition to classifying the nodes with the same type information into one category, a relationship between the nodes is recorded, to obtain a hierarchical relationship of each node in the topological structure diagram.

Operation 103: Display the topological structure diagram in a display interface based on a classification result.

The topological structure diagram is classified based on the node types, and the hierarchical relationship of each node is determined. Therefore, according to the method provided in this embodiment, the topological structure diagram can be displayed in the display interface based on the classification result and the hierarchical relationship.

The topology information is classified, and the topological structure diagram is displayed based on the classification result. In this way, displayed content is organized and more orderly, operability and usability are improved, and user experience can be improved. In addition, rendering is facilitated, memory and time are saved, and page freezing is avoided.

In an example embodiment, displaying the topological structure diagram in a display interface based on a classification result includes: displaying a reference-quantity-layer topology structure in the display interface based on the classification result, and when any node in the (reference-quantity)$^{th}$ layer of topology structure is selected, continuing to display a lower layer of topology structure of the selected node.

A reference quantity may be set based on experience or an application scenario, or may be determined based on the node types. For example, a node of a specified type is to be displayed as a last layer, and the reference quantity is determined based on the layer at which the node of the specified type is located. For example, one layer at which a router is located and a quantity of layers above the layer at which the router is located in a topology structure is used as the reference quantity, for example, four layers. In this case, the (reference-quantity)$^{th}$ layer is the fourth layer. In other words, a topology structure corresponding to the layer at which the router is located and topology structures corresponding to the layers above are displayed. In this case, the layer at which the router is located is the last layer that is currently displayed, that is, the fourth layer. When any node in the fourth layer of topology structure is selected, a lower layer of topology structure of the selected node continues to be displayed. In addition, a quantity of nodes in a lower layer of topology structure may be further displayed for each node in each layer of displayed topology structure.

The reference-quantity-layer topology structure is displayed in the display interface, and when any node in the (reference-quantity)$^{th}$ layer of topology structure is selected, the lower layer of topology structure of the selected node continues to be displayed. A topology structure is subsequently displayed when there is a displaying requirement. In this way, the displaying requirement is met, the topology structure displayed in the display interface is more orderly, memory and time are further saved, and page smoothness is improved.

Figure 2:
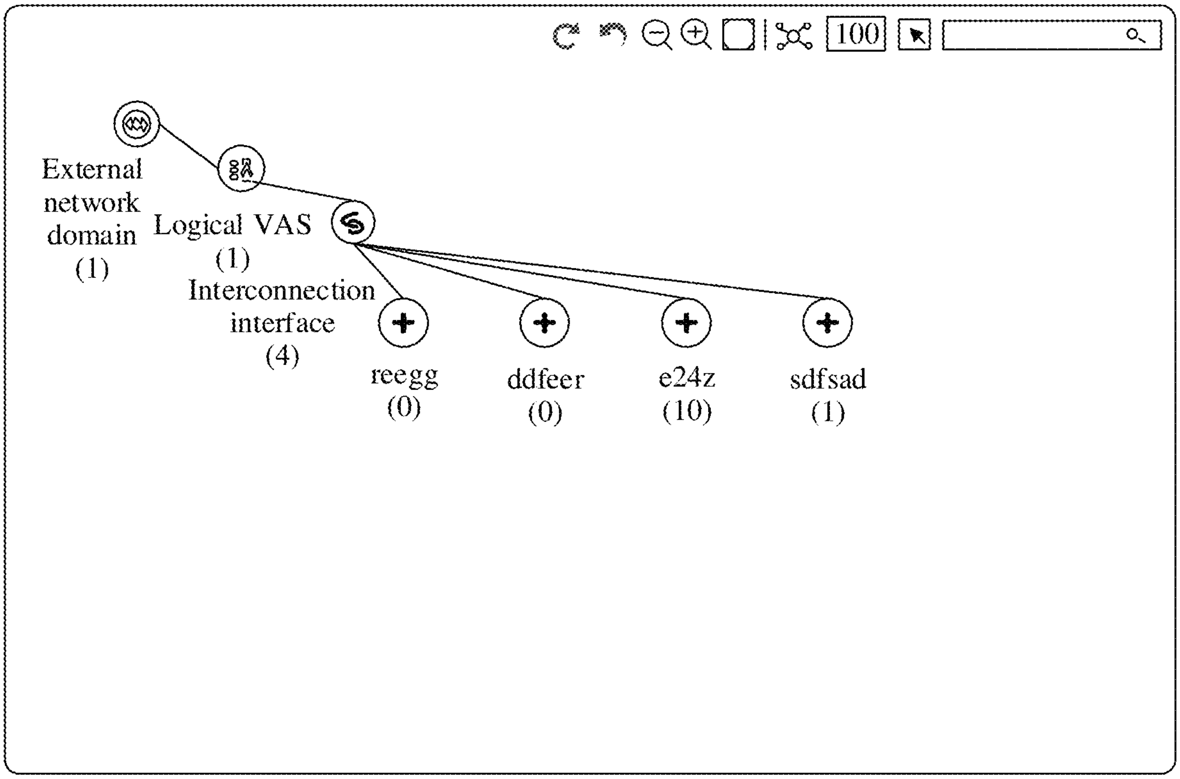
FIG. 2 is a schematic diagram of a display interface according to an embodiment of this application.
Figure 3:
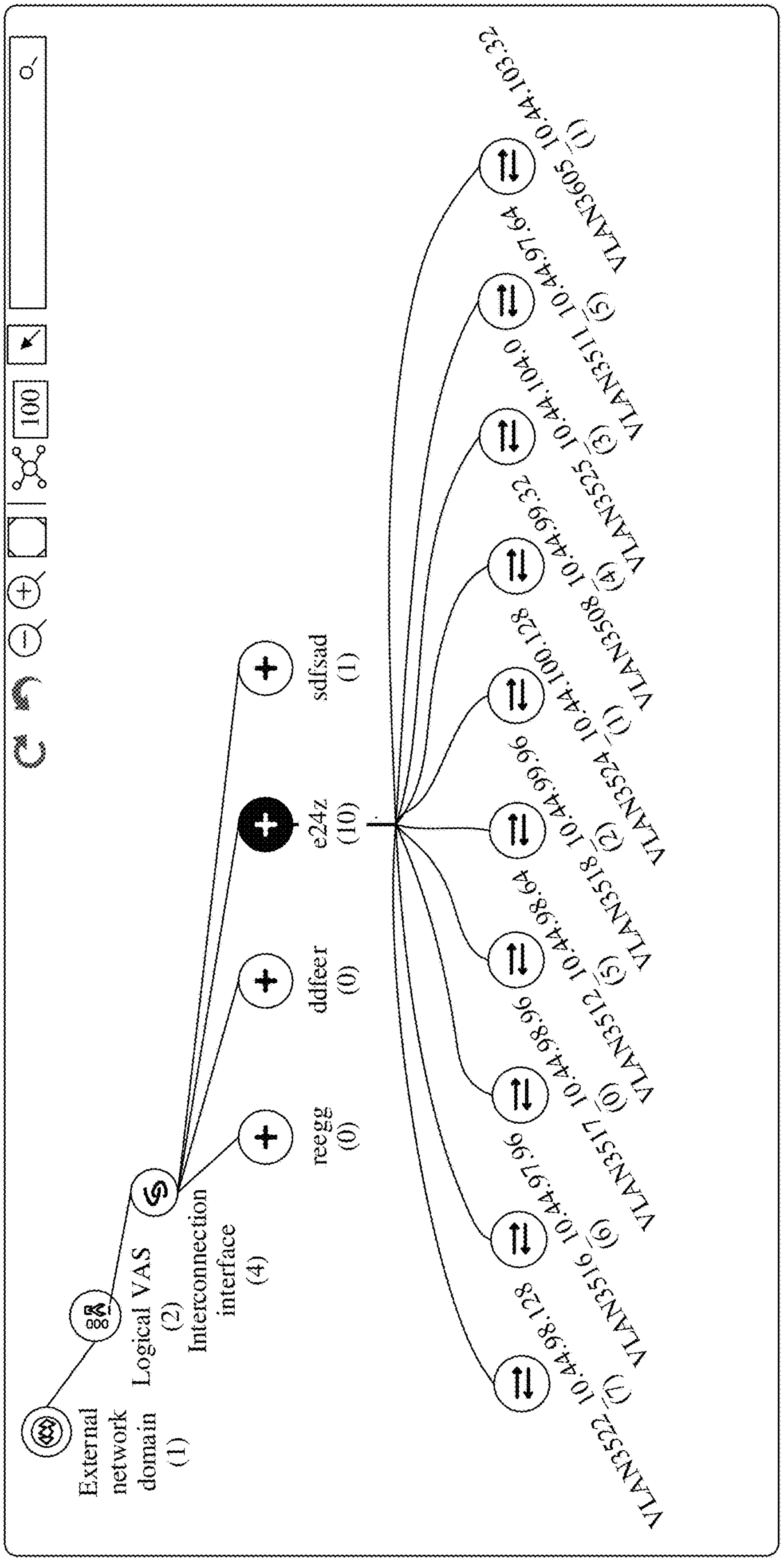
FIG. 3 is a schematic diagram of a display interface according to an embodiment of this application.

For example, FIG. 2 shows an example of a display interface for displaying the reference-quantity-layer topology structure based on the classification result. In FIG. 2, a four-layer topology structure is displayed in the display interface based on the classification result. The four layers are an external network domain layer, a logical VAS layer, an interconnection interface layer, and a logical router layer. The logical router layer includes four logical routers named reegg, ddfeer, e24z, and sdfsad. When any node in the fourth layer of topology structure is selected, a lower layer of topology structure of the selected node continues to be displayed. For example, on the basis of the display interface shown in FIG. 2, a lower layer of topology structure of a selected node continues to be displayed, as shown in FIG. 3. After a node named e24z is selected, a lower layer of topology structure of the node e24z continues to be displayed. The lower layer of topology structure includes 10 logical switch nodes: VLAN3522_10.44.98.128, VLAN3516_10.44.97.96, VLAN3517_10.44.98.96, VLAN3512_10.44.98.64, VLAN3518_10.44.99.96, VLAN3524_10.44.100.128, VLAN3508_10.44.99.32, VLAN3525_10.44.104.0, VLAN3511_10.44.97.64, and VLAN3605_10.44.103.32.

In an example embodiment, continuing to display a lower layer of topology structure of the selected node includes: when a quantity of nodes in the lower layer of topology structure of the selected node is greater than a reference quantity, displaying the lower layer of topology structure of the selected node in a pagination manner, and displaying a page switching control in the display interface; and switching a page by using the page switching control, where different pages display different nodes in the lower layer of structure of the selected node.

Figure 4:
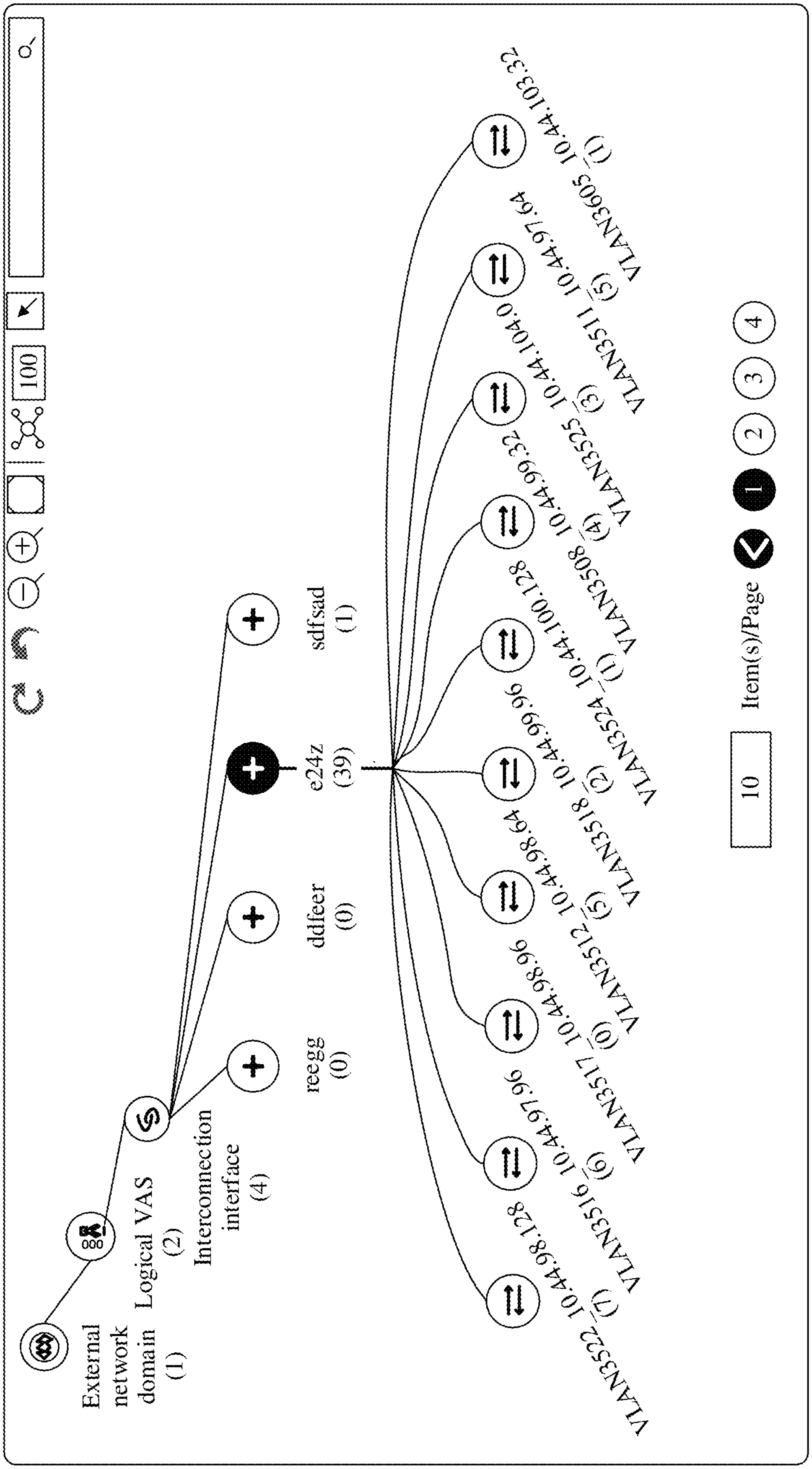
FIG. 4 is a schematic diagram of a display interface according to an embodiment of this application.

In FIG. 3, that a quantity of nodes in the lower layer of topology structure of the node e24z is 10 is merely used as an example. If the quantity of nodes in the lower layer of topology structure of e24z is greater than 10, for example, if the quantity of nodes in the lower layer of topology structure of e24z is 39, after the node e24z is selected, the lower layer of topology structure of the node e24z continues to be displayed, and a display interface may be shown in FIG. 4. For example, if a maximum of 10 nodes can be displayed on each page, the lower layer of topology structure of the node e24z needs to be displayed on four pages. FIG. 4 currently shows the first page. Each page has a corresponding page switching control, and different pages are switched by using the page switching control.

In addition, regardless of FIG. 3 or FIG. 4, a quantity of nodes in a lower layer of topology structure of each node is displayed under each node. For example, a node sdfsad in FIG. 3 or FIG. 4 is used as an example. Herein, (1) under the node sdfsad indicates that there is one node in a lower layer of topology structure of the node sdfsad.

In an example embodiment, the display interface includes a first display area and a second display area; a node used to construct a network topology diagram and a diagram element corresponding to a communications medium are displayed in the first display area.

The step of displaying a reference-quantity-layer topology structure in the display interface based on the classification result, and when any node in the (reference-quantity)$^{th}$ layer of topology structure is selected, continuing to display a lower layer of topology structure of the selected node includes: displaying the reference-quantity-layer topology structure in the second display area based on the classification result, and when any node in the (reference-quantity)$^{th}$ layer of topology structure is selected, continuing to display the lower layer of topology structure of the selected node; and when any diagram element in the first display area is selected, updating, based on the selected diagram element, the topology structure displayed in the second display area.

When any diagram element in the first display area is selected, the topology structure displayed in the second display area is updated based on the selected diagram element. The topology structure is updated based on the diagram element in the first display area, and therefore a topology structure displaying function is extended.

Figure 5:
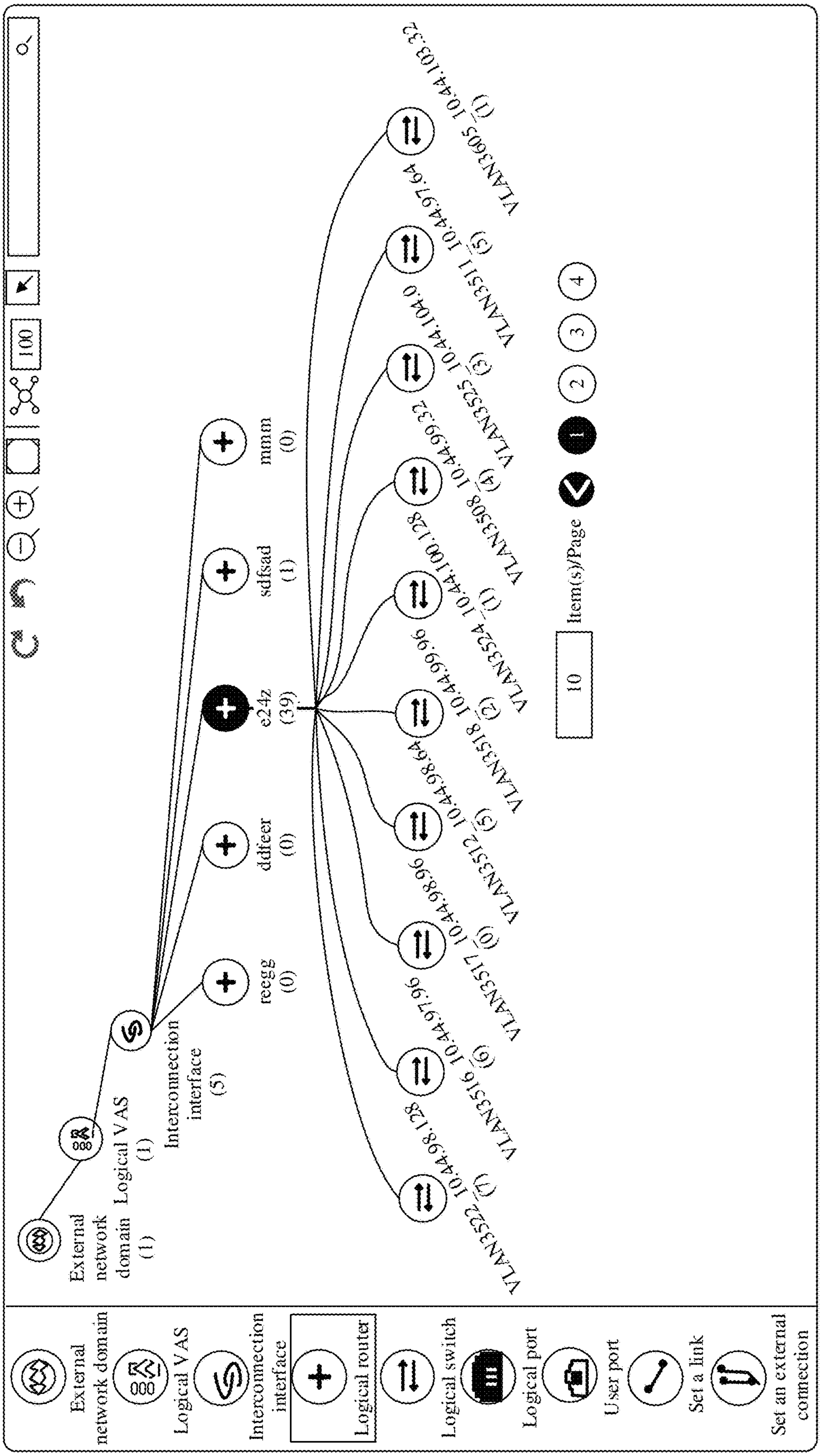
FIG. 5 is a schematic diagram of a display interface according to an embodiment of this application.

A display interface shown in FIG. 5 is used as an example. The left area in FIG. 5 is a first display area, and diagram elements that represent different types of nodes such as an external network domain, a logical VAS, an interconnection interface, a logical router, a logical switch, a logical port, and a user port are displayed in the first display area. Nodes corresponding to these diagram elements are used as nodes for constructing the network topology diagram. In addition, the first display area further includes diagram elements corresponding to two communications media: "set a link" and "set an external connection". As shown in FIG. 5, a four-layer topological structure diagram is displayed in a second display area on the right side, and includes four layers: an external network domain layer, a logical VAS layer, an interconnection interface layer, and a logical router layer. After anode e24z in the fourth layer of topology structure in the second display area is selected, a lower layer of topology structure of the node e24z is continued to be displayed. For example, if a diagram element of the logical router in the first display area is selected, a diagram element of a newly added logical router may be displayed in the second display area. Then, the newly added logical router may be connected to the interconnection interface based on "set a link", to establish a new topology relationship. As shown in FIG. 5, the newly added diagram element of the logical router is named mmm. The new topology relationship is established, so that the topology structure displayed in the second display area is updated based on the selected diagram element.

In an example embodiment, continuing to display a lower layer of topology structure of the selected node includes: displaying the lower layer of topology structure of the selected node in a manner different from a manner for an unselected node. For example, the lower layer of topology structure of the selected node is highlighted. Alternatively, the lower layer of topology structure of the selected node is displayed in a different color. The manner that is different from the manner for the unselected node is not limited in this embodiment of this application.

In addition to the foregoing displaying manner, in an example embodiment, the display interface includes a first display area and a second display area; and in operation 103, displaying the topological structure diagram in a display interface based on a classification result includes but is not limited to: displaying, in the first display area, diagram elements corresponding to different types of nodes in the topological structure diagram; and after any diagram element in the first display area is selected, displaying, in the second display area based on a hierarchical relationship, a topology structure corresponding to a node type corresponding to the selected diagram element.

Figure 6:
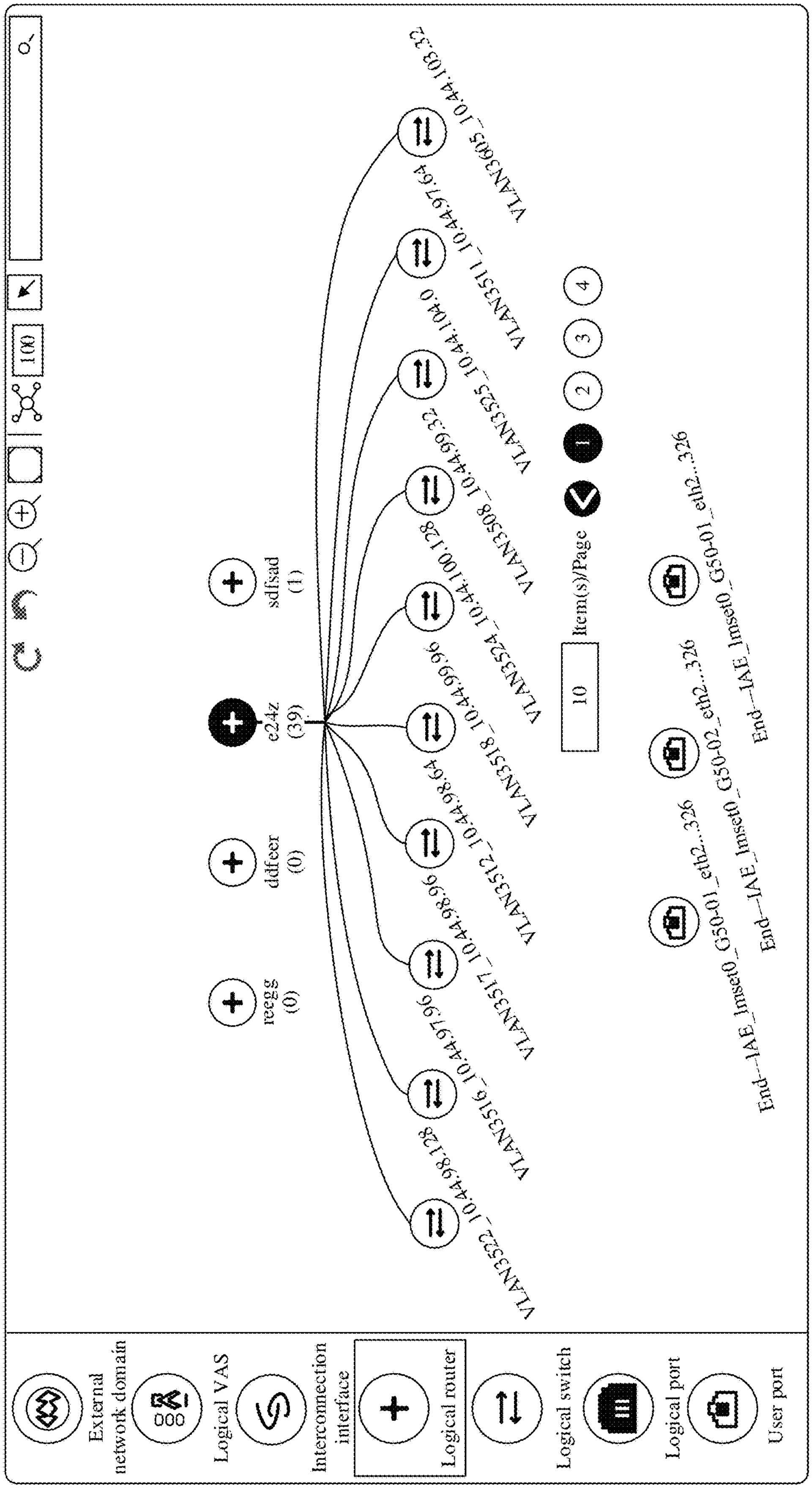
FIG. 6 is a schematic diagram of a display interface according to an embodiment of this application.
Figure 7:
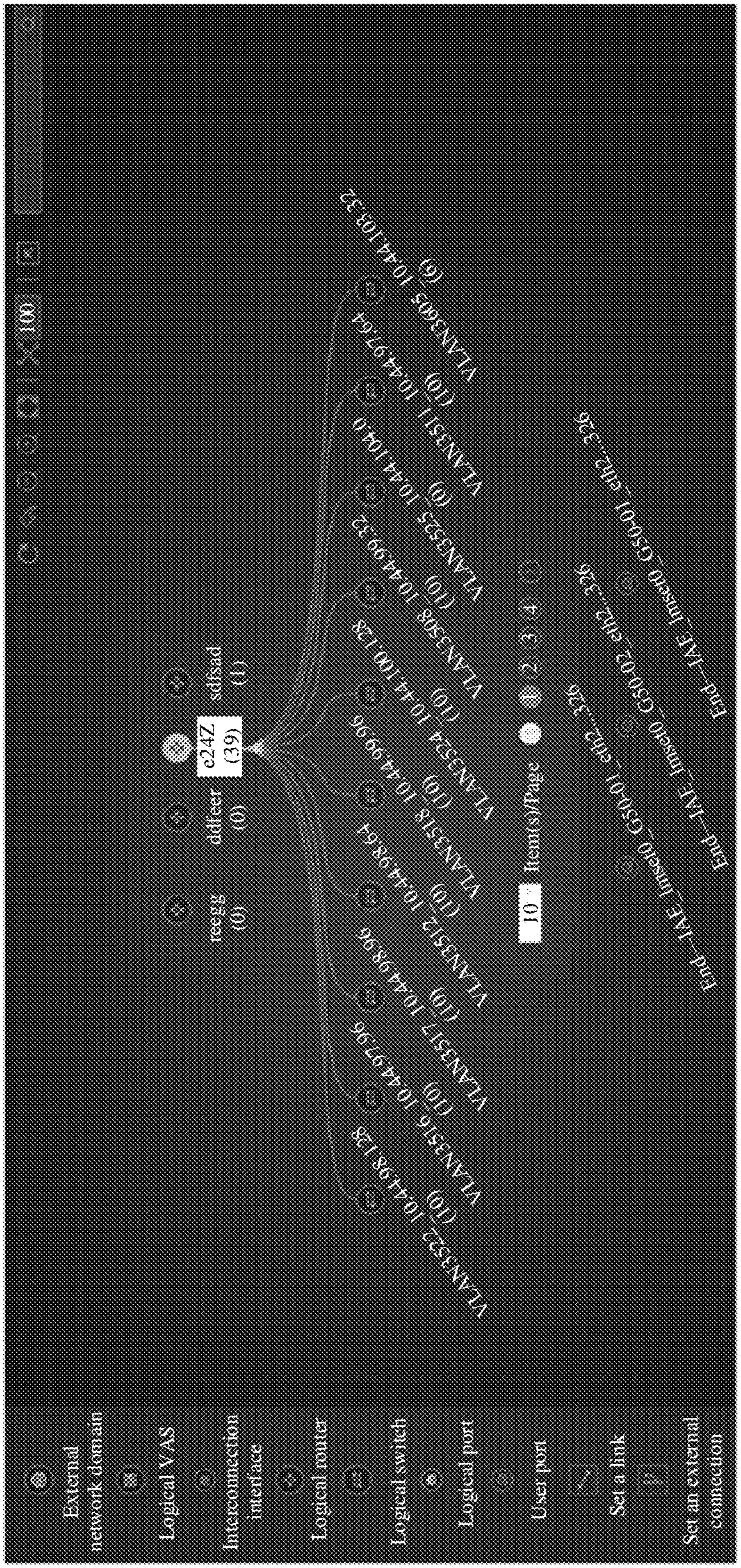
FIG. 7 is a schematic diagram of a display interface according to an embodiment of this application.

As shown in FIG. 6, a left area includes a first display area, and diagram elements corresponding to nodes of types including an external network domain, a logical VAS, an interconnection interface, a logical router, a logical switch, a logical port, a user port, and the like are displayed in the first display area. In other words, the topological structure diagram includes a plurality of nodes, and these nodes are of the foregoing several types. For example, a diagram element corresponding to the logical router in the first display area is selected. In this case, a topology structure that corresponds to a node type corresponding to the selected diagram element and that is displayed in a second display area based on a hierarchical relationship may be shown on the right side in FIG. 6. In other words, a topology structure corresponding to a node type of the logical router is displayed in the second display area shown on the right side in FIG. 6. As shown in FIG. 6, there are four logical routers in the topological structure diagram. In addition to FIG. 6, for the second display area, reference may also be made to FIG. 7.

In an example embodiment, displaying, in the second display area based on a hierarchical relationship, a topology structure corresponding to a node type corresponding to the selected diagram element includes: displaying, in the second display area based on the hierarchical relationship, the first layer of topology structure corresponding to a same type of node corresponding to the selected diagram element; and after any node in the first layer of topology structure is selected, continuing to display a lower layer of topology structure of the selected node.

The diagram elements corresponding to the different types of nodes in the topological structure diagram are displayed in the first display area, and after any diagram element in the first display area is selected, a lower layer of topology structure of a selected node continues to be displayed based on a hierarchical relationship. A topology structure is subsequently displayed when there is a displaying requirement. In this way, the displaying requirement is met, the topology structure displayed in the display interface is more orderly, memory and time are further saved, and page smoothness is improved.

As shown in FIG. 6, four logical routers are displayed in the second display area, and the four logical routers are named reegg, ddfeer, e24z, and sdfsad. The four logical routers may be considered as forming the first layer of topology structure, and the third logical router (e24z) is selected, in other words, the third logical router is a selected node. Then, a lower layer of topology structure of the third logical router, that is, diagram elements corresponding to logical switches, is displayed in the second display area.

It can be seen that, in this manner, page switching based on the logical routers can be implemented, and a proper spacing can be maintained, so that diagram elements of the routers are displayed in parallel, and the diagram elements of the routers are organized.

In an example embodiment, continuing to display a lower layer of topology structure of the selected node includes: when a quantity of nodes in the lower layer of topology structure of the selected node is greater than a reference quantity, displaying the lower layer of topology structure of the selected node in a pagination manner, and displaying a page switching control in the display interface; and switching a page by using the page switching control, where different pages display different nodes in the lower layer of structure of the selected node.

As shown in FIG. 6, the third logical router (e24z) is the selected node, and there are a relatively large quantity of nodes in the lower layer of topology structure of the third logical router. Therefore, the lower layer of topology structure is displayed in the pagination manner. In addition, when each layer of topology structure is displayed, a prompt of a quantity of lower-layer nodes corresponding to a node in the layer of topology structure may be provided. For example, a quantity of lower-layer nodes corresponding to each node is also displayed in the second display area. As shown in FIG. 6, under the four displayed logical routers, a quantity of lower-layer nodes corresponding to each logical router is displayed under a diagram element of the logical router. For example, in FIG. 6, quantities of lower-layer nodes corresponding to the first logical router (reegg) and the second logical router (ddfeer) are both 0; a value (39) is displayed under a diagram element of the third logical router, where 39 indicates that there are 39 lower-layer nodes corresponding to the third logical router; and a quantity of lower-layer nodes corresponding to the fourth logical router (sdfsad) is 1, where 1 indicates that there is one lower-layer node corresponding to the fourth logical router. A pagination control, for example, a specific item/page, is displayed in the second display area. A quantity of items displayed on each page is not limited in this application. For example, in FIG. 6, 10 items, namely, 10 nodes, are displayed on each page, and the first page is currently displayed. A total of 4 pages are required to display the 39 lower-layer nodes corresponding to the third logical router. A page switching control for switching between previous and next pages is also displayed before and after page numbers. The page switching control for switching between previous and next pages can be used to implement switching between different pages, so that a displayed node can be searched for on a displayed page. Different nodes are displayed in the pagination manner. Therefore, different pages display different nodes in the lower layer of structure of a selected node.

In an example embodiment, continuing to display a lower layer of topology structure of the selected node includes: displaying the lower layer of topology structure of the selected node in a manner different from a manner for an unselected node. This highlights the lower layer of topology structure of the selected node.

It should be noted that a function of a diagram element in the first display area in FIG. 6 is different from a function of a diagram element in the first display area in FIG. 5. The diagram element in the first display area in FIG. 5 is used to update a topology. For example, a new diagram element is added to the topology displayed in the second display area. The diagram element in the first display area in FIG. 6 is used for selection of a node in the topology displayed in the second display area. If a diagram element in the first display area in FIG. 6 is selected, a layer of topology structure in which the selected diagram element is located and a lower layer of topology structure of the selected diagram element are displayed in the second display area in FIG. 6.

In addition, the second display area may not only include diagram elements of nodes that are associated with each other, but also include an isolated node. The isolated node is a node that has no connection relationship with another node. Whether the second display area includes an isolated node is determined based on the topology information. In other words, whether there is an isolated node is determined based on the topology information of the topological structure diagram that needs to be displayed. If an isolated node is determined based on the topology information of the topological structure diagram that needs to be displayed, the isolated node is displayed in the second display area. If no isolated node is determined based on the topology information of the topological structure diagram that needs to be displayed, no isolated node is displayed in the second display area. For example, no isolated node is displayed in the second display area shown in FIG. 5, and isolated nodes, for example, a node End-IAE_lmset0-G50-01_eth2 . . . 326, a node End-IAE_lmset0-G50-02_eth2 . . . 326, and a node End-IAE_lmset0-G50-01_eth2 . . . 326, are displayed in the second display area in FIG. 6.

In addition to the foregoing displaying manners, the method provided in this embodiment of this application supports displaying in a manner in which a single router is used as a to-be-expanded point and only related information of the current router may be displayed. In other words, the displaying manners corresponding to FIG. 2 to FIG. 5 and the displaying manners corresponding to FIG. 6 and FIG. 7 all support displaying in a manner in which a single router is used as a to-be-expanded point and only related information of a current router can be displayed. Based on this, in an example embodiment, in a process of continuing to display the lower layer of topology structure of the selected node, the method further includes: hiding a diagram element other than the selected node and an upper layer and a lower layer of topology structures of the selected node. Hiding the diagram element other than the selected node and the upper layer and the lower layer of topology structures of the selected node means that the selected node and a diagram element related to the selected node are displayed but a diagram element that is unrelated to the selected node is hidden.

In an example embodiment, before hiding the diagram element other than the selected node and the upper layer and the lower layer of topology structures of the selected node, the method further includes: displaying a control menu, where the control menu displays an option used to indicate to display a diagram element related to the selected node; and hiding the diagram element other than the selected node and the upper layer and the lower layer of topology structures of the selected node by using the option that is in the control menu and that is used to indicate to display the diagram element related to the selected node. In this manner, if a router is used as an example of the selected node, another router that is unrelated to the selected router can be filtered, so that fewer icons are displayed in the topology, and networking information of the single router can be effectively viewed.

Figure 8:
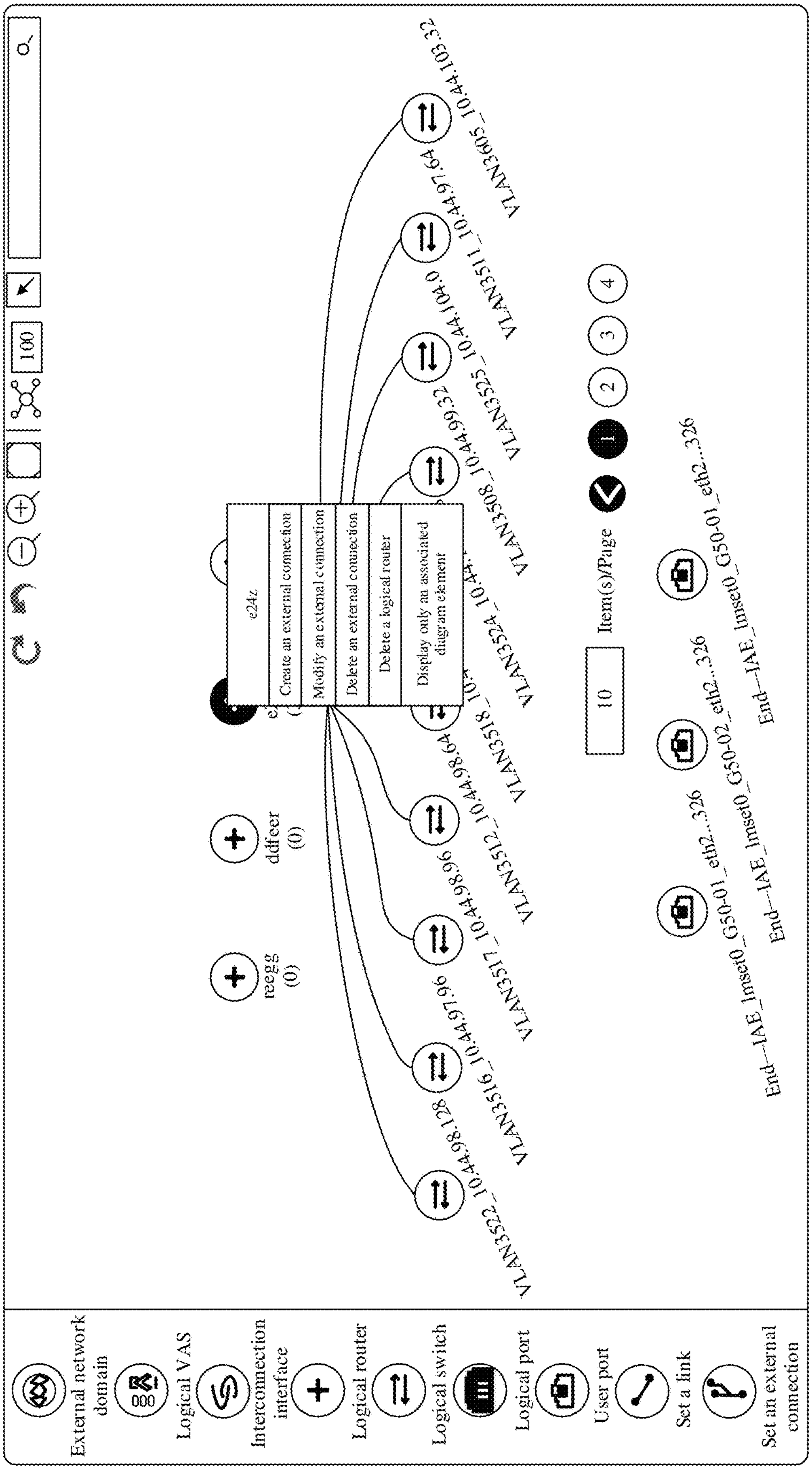
FIG. 8 is a schematic diagram of a display interface according to an embodiment of this application.
Figure 9:
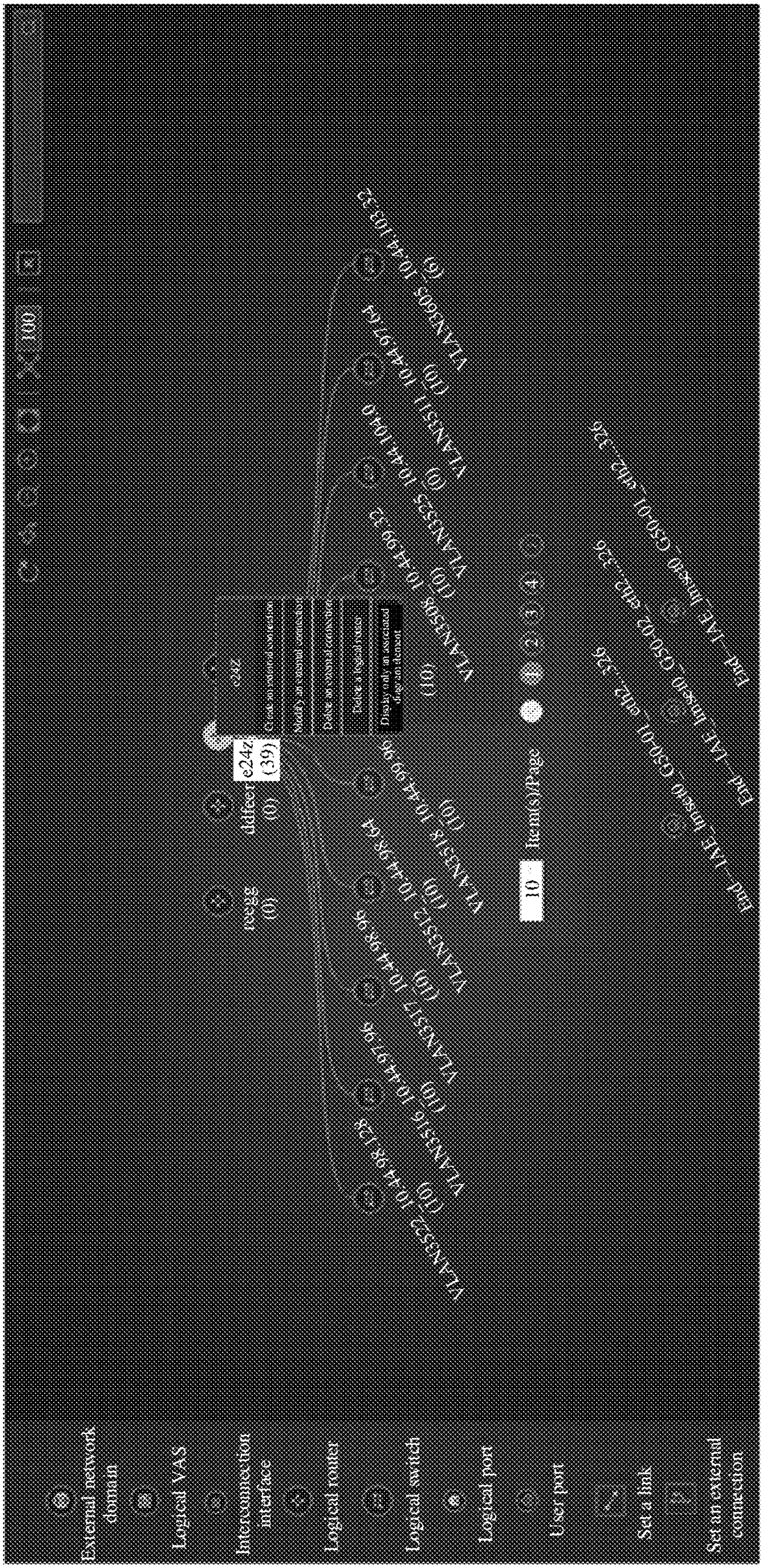
FIG. 9 is a schematic diagram of a display interface according to an embodiment of this application.

As shown in FIG. 8 or FIG. 9, a control menu displayed in a second display area includes several options such as creating an external connection, modifying an external connection, deleting an external connection, deleting a logical router, and displaying only an associated diagram element. Displaying only an associated diagram element is the option used to indicate to display the diagram element related to the selected node.

Figure 10:
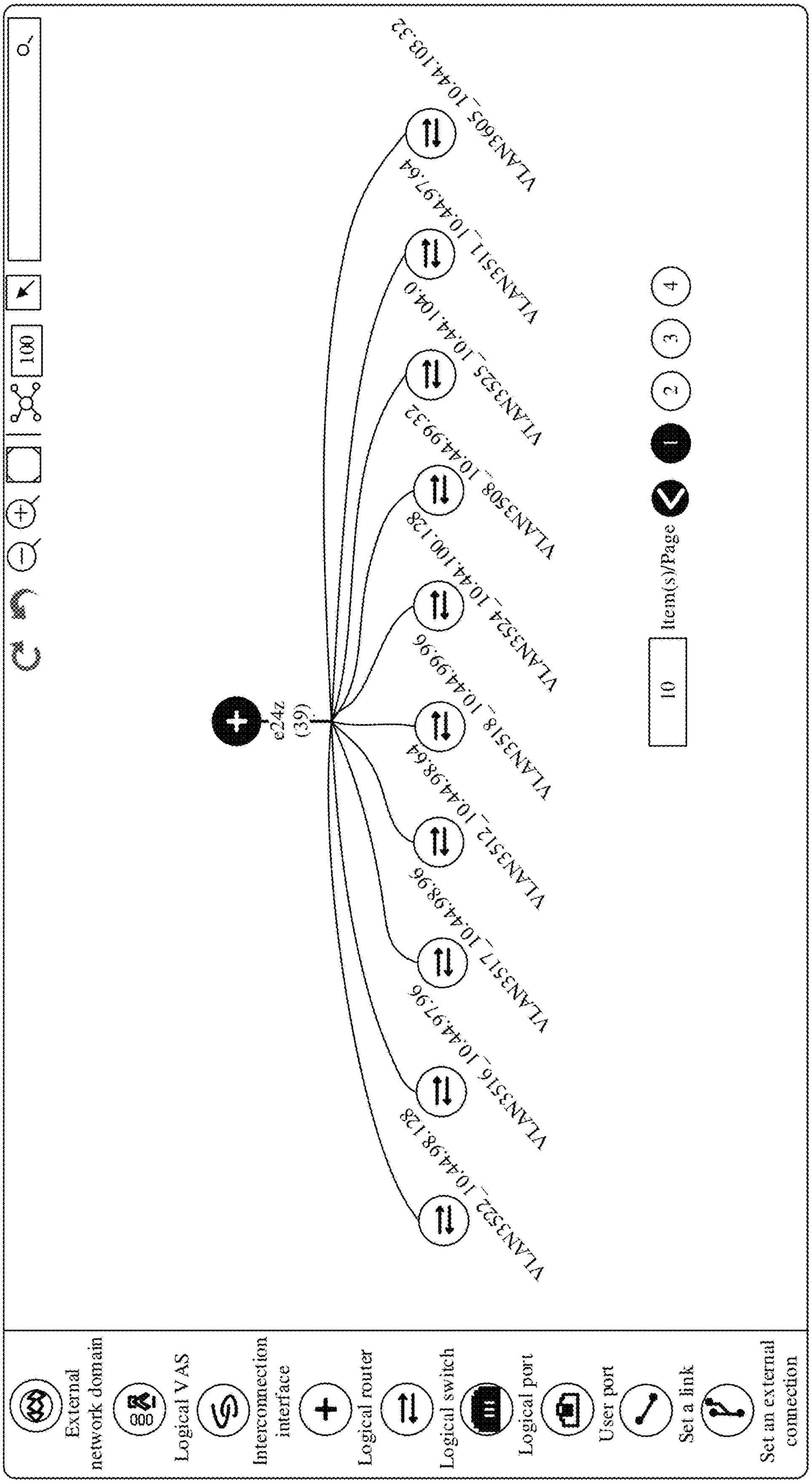
FIG. 10 is a schematic diagram of a display interface according to an embodiment of this application.
Figure 11:
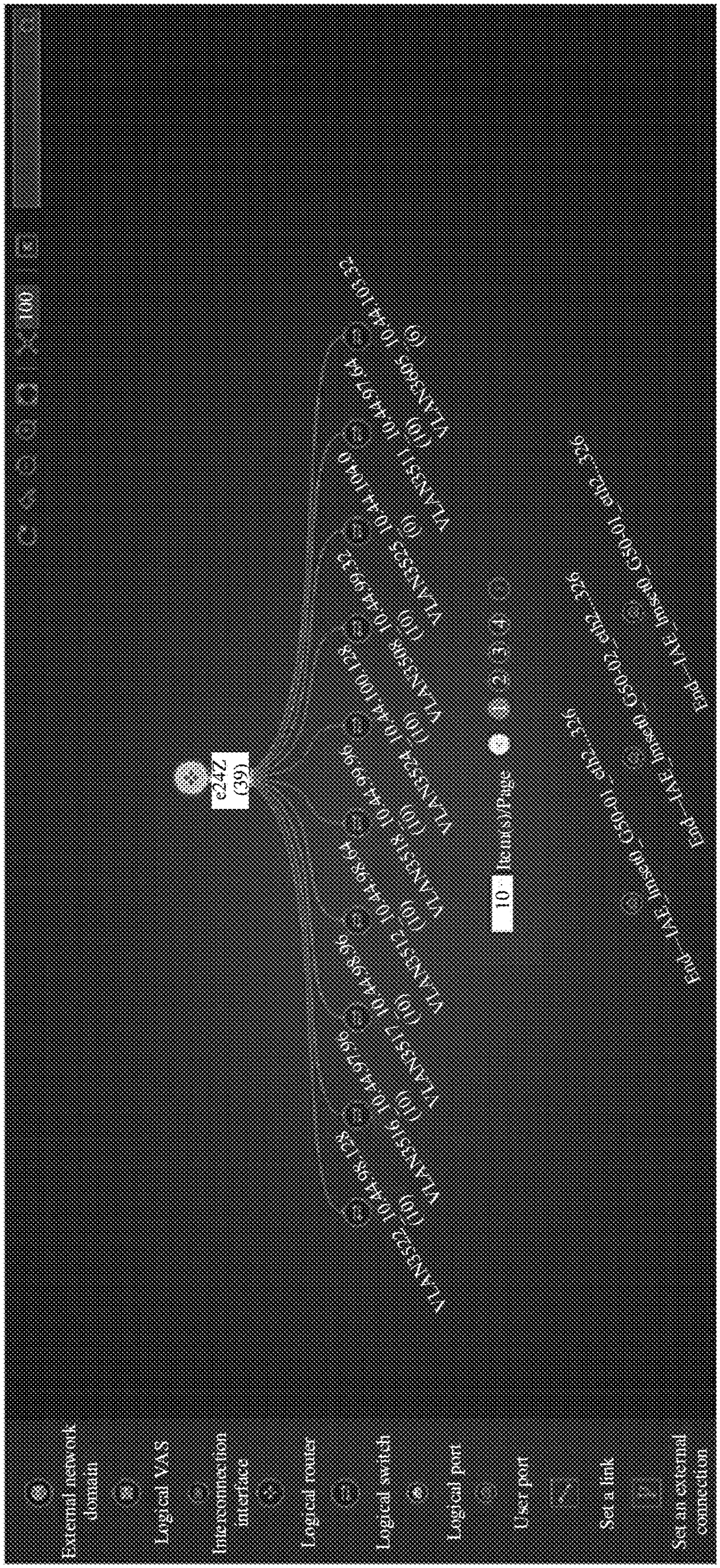
FIG. 11 is a schematic diagram of a display interface according to an embodiment of this application.

After the option of displaying only an associated diagram element is selected, a display interface is shown in FIG. 10 or FIG. 11. It can be learned from FIG. 10 and FIG. 11 that only related information of the third logical router is displayed in the second display area.

In an example embodiment, the display interface further displays a search box; and after displaying the topological structure diagram in a display interface based on a classification result, the method further includes: obtaining node information entered in the search box; and displaying, in the display interface, a topology structure in which a node corresponding to the node information is located. For example, the node information entered in the search box may include a name of a node. In addition, in addition to manually entering the node information by a user, the method provided in this embodiment of this application further supports displaying selectable node information. For example, after the search box is triggered, node information may be selected from a drop-down box under the search box. Therefore, there is no need to manually enter node information. Further, search efficiency is improved, and user experience is improved.

Figure 12:
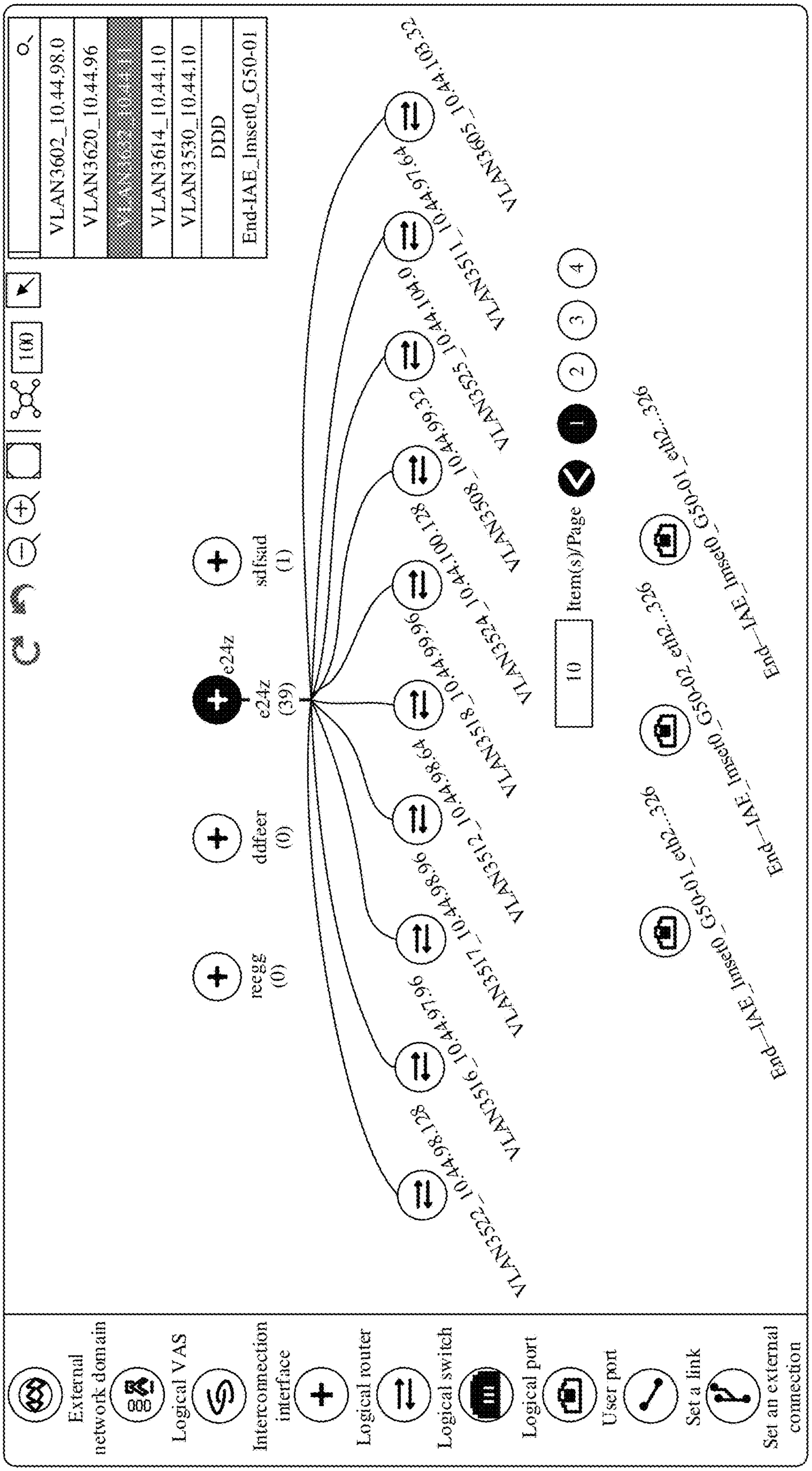
FIG. 12 is a schematic diagram of a display interface according to an embodiment of this application.
Figure 13:
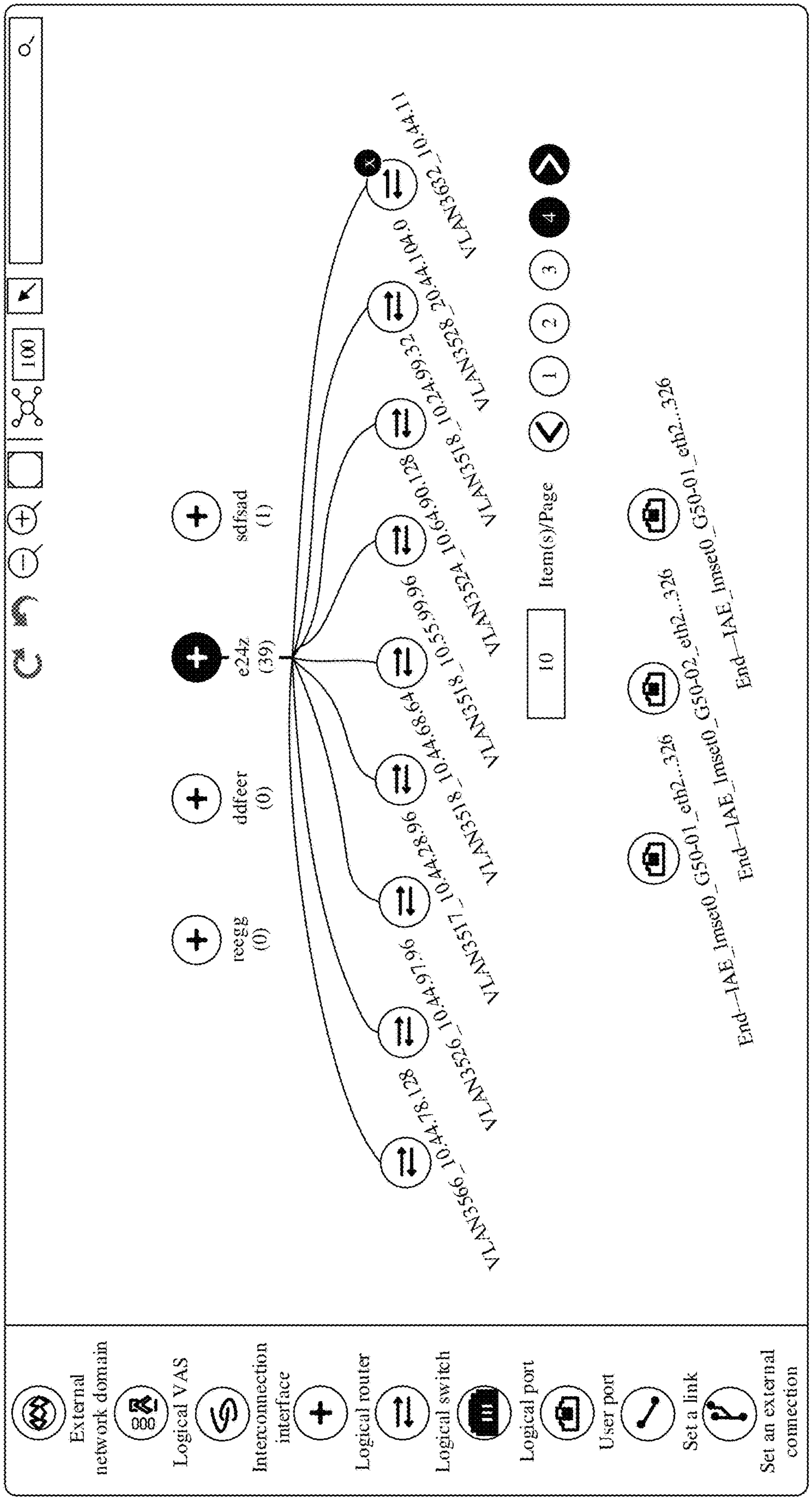
FIG. 13 is a schematic diagram of a display interface according to an embodiment of this application.
Figure 14:
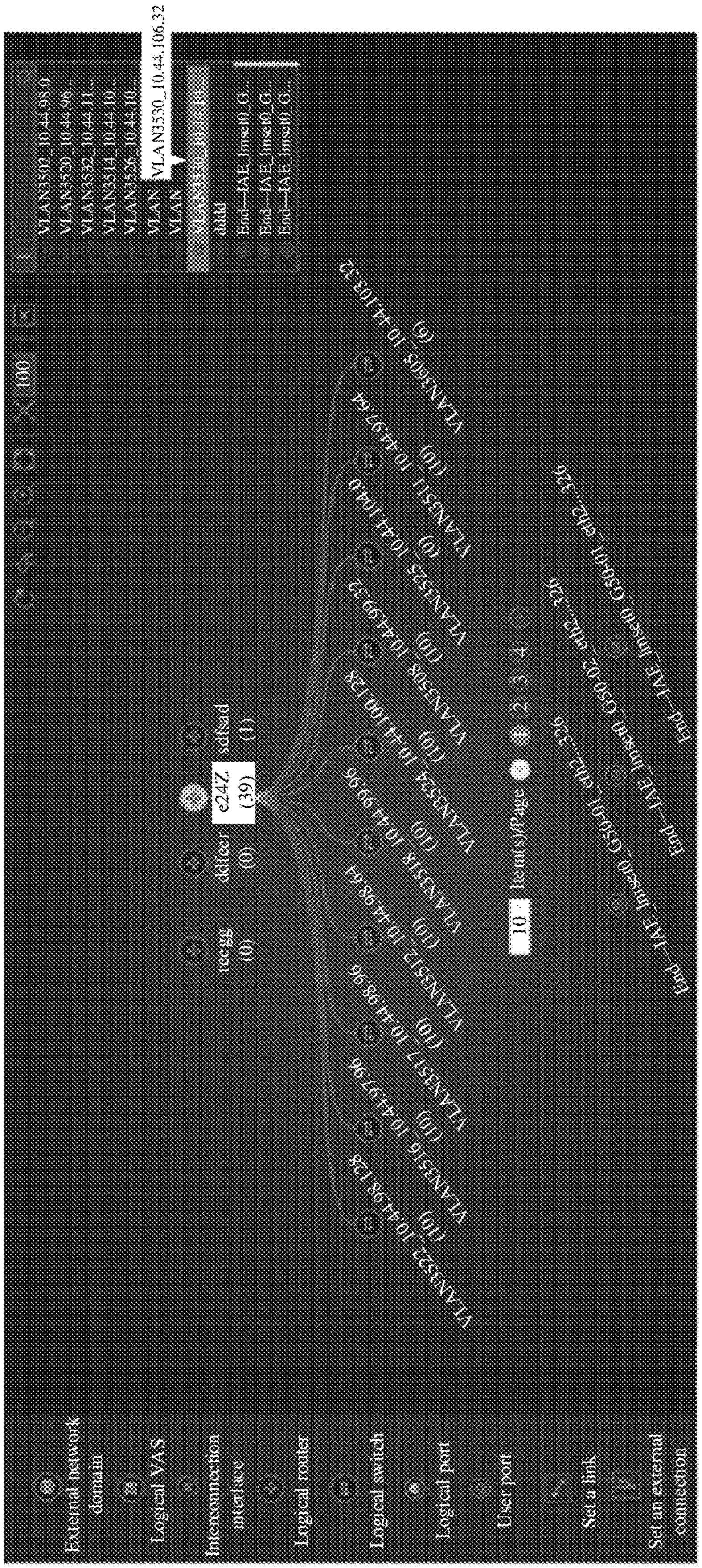
FIG. 14 is a schematic diagram of a display interface according to an embodiment of this application.
Figure 15:
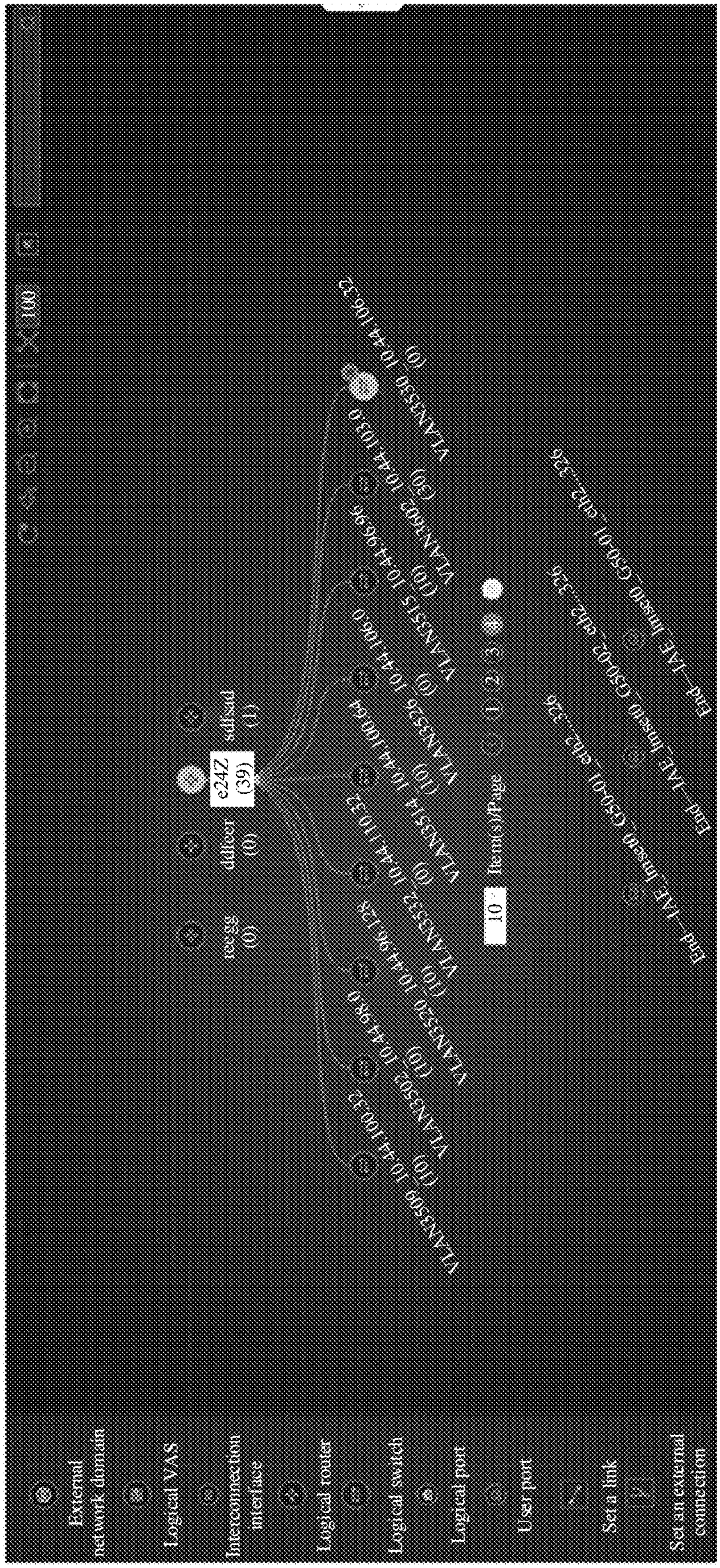
FIG. 15 is a schematic diagram of a display interface according to an embodiment of this application.

In this manner, cross-page search and dynamic page switching can be implemented. Cross-page search and dynamic page switching are implemented, so that a diagram element is effectively located and edited. As shown in FIG. 12, a display interface includes a search box in the upper right corner, and selectable node information VLAN3530_10.44.106.32 displayed under the search box is selected. As shown in FIG. 13, a topology structure in which VLAN3530_10.44.106.32 is located is displayed in a second display area. In this manner, cross-page search and dynamic page switching can be implemented, and a diagram element corresponding to VLAN3530_10.44.106.32 can be located and found for viewing. In addition, in an optional manner, a delete icon may further be displayed on a diagram element of a node corresponding to selected node information, and a delete operation may be performed based on the icon. Similar to FIG. 12, FIG. 14 also displays the search box in the upper right corner of the display interface, and an interface after search is displayed, as shown in FIG. 15.

In an example embodiment, displaying the topological structure diagram in a display interface based on a classification result includes: when a quantity of nodes in any layer of topology structure is greater than a quantity threshold, displaying the nodes in the any layer of topology structure in an aggregation manner. The quantity threshold may be set based on experience or an application scenario. This is not limited in this embodiment of this application. For example, the quantity threshold may be alternatively determined by setting an aggregation granularity. For example, an aggregation component is displayed in the display interface, and the aggregation component includes an aggregation control and an aggregation granularity setting box. The quantity threshold may be entered in the aggregation granularity setting box, and the aggregation control is used to trigger an operation of displaying the nodes in the any layer of topology structure in the aggregation manner based on the quantity threshold.

For nodes that need to be displayed in an aggregation manner, information about the aggregated node is not directly displayed during displaying in the aggregation manner. Therefore, when information about a node in this layer of topology structure is requested from a server, the server may not deliver the information about the aggregated nodes, but delivers the information about the aggregated nodes only when the information about the aggregated nodes needs to be displayed. If no requirement for displaying the information about the aggregated nodes is triggered subsequently, the server may not deliver the information about the aggregated nodes. In this way, data delivered by the server can be reduced, and memory consumption and rendering pressure of a browser can be reduced.

Figure 16:
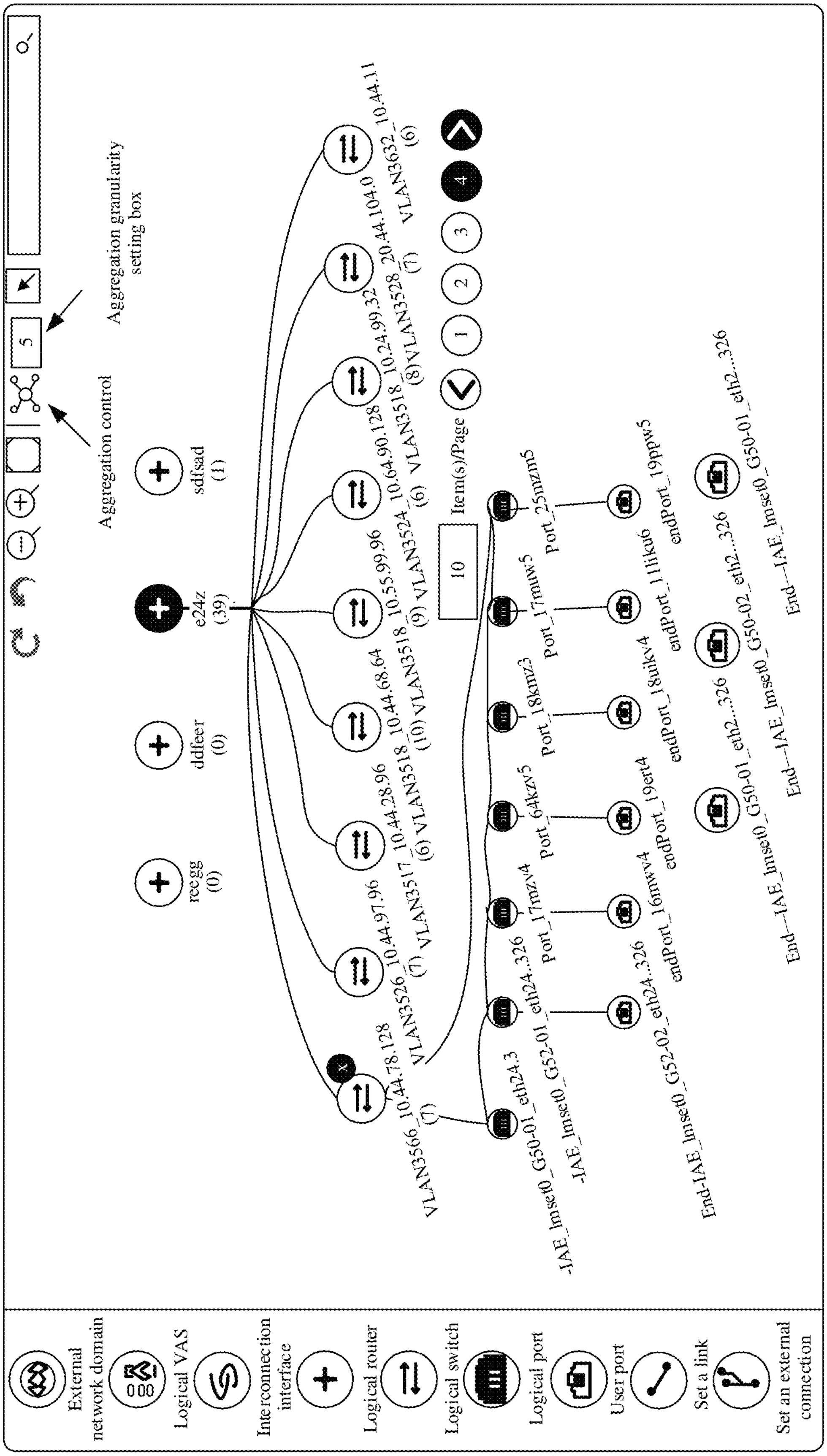
FIG. 16 is a schematic diagram of a display interface according to an embodiment of this application.
Figure 17:
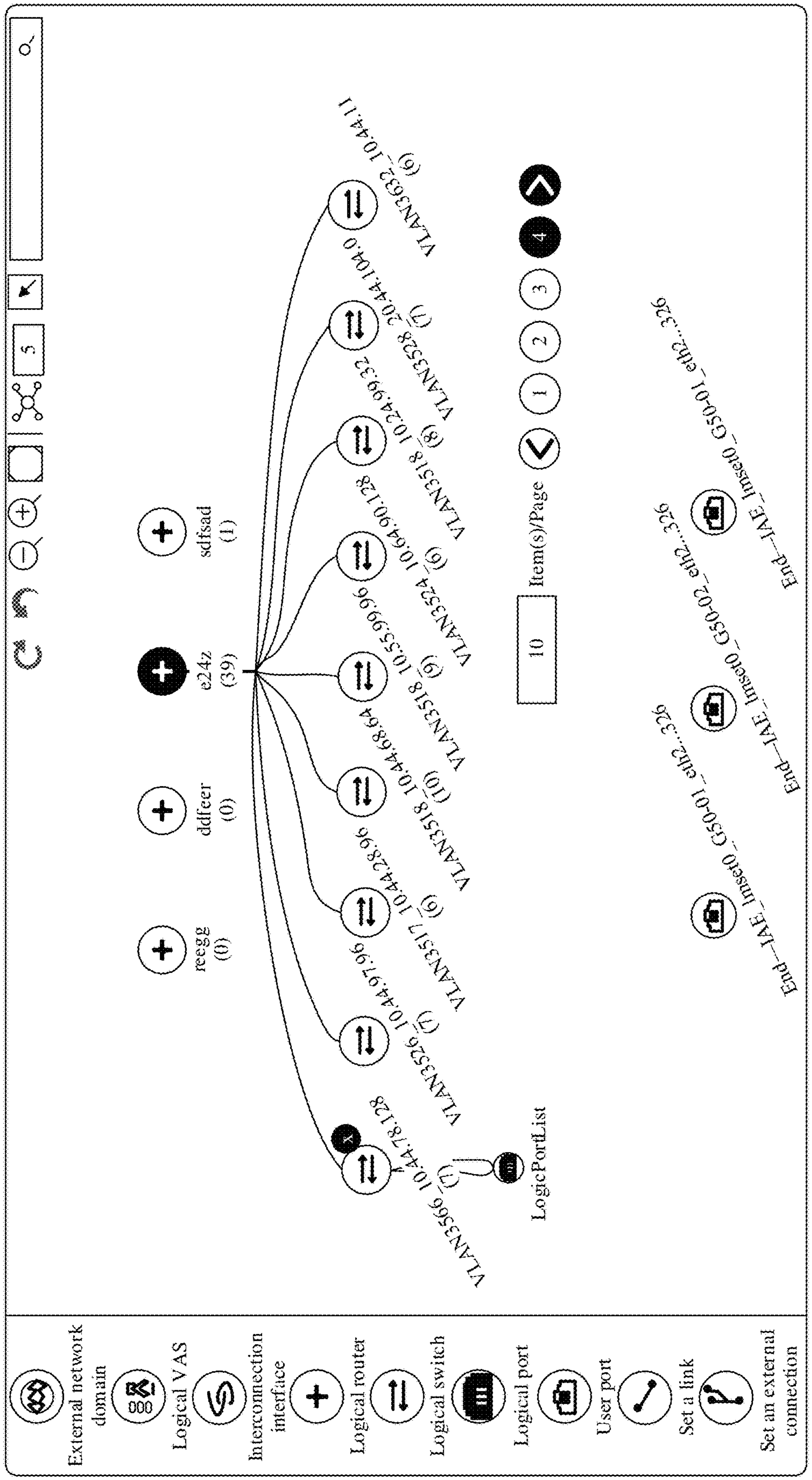
FIG. 17 is a schematic diagram of a display interface according to an embodiment of this application.
Figure 18:
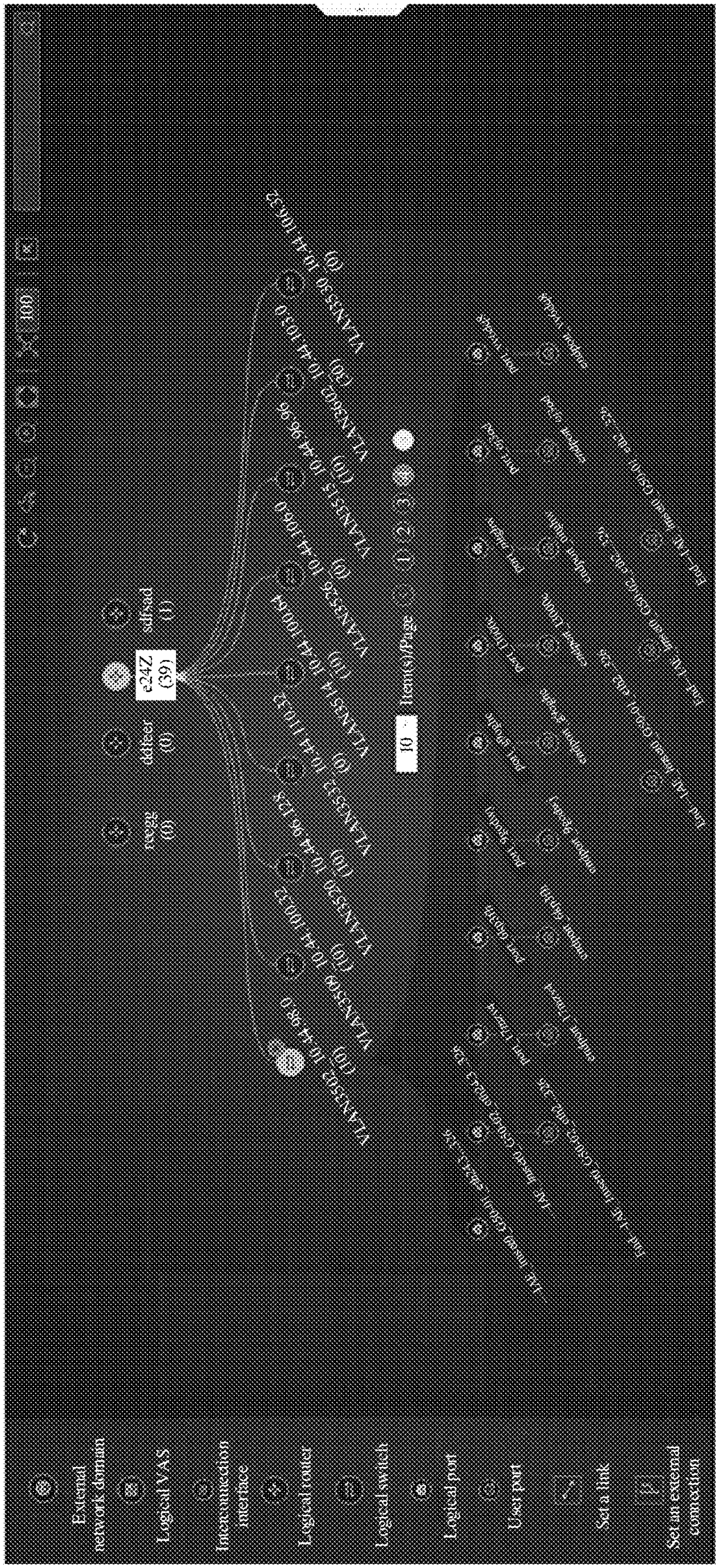
FIG. 18 is a schematic diagram of a display interface according to an embodiment of this application.
Figure 19:
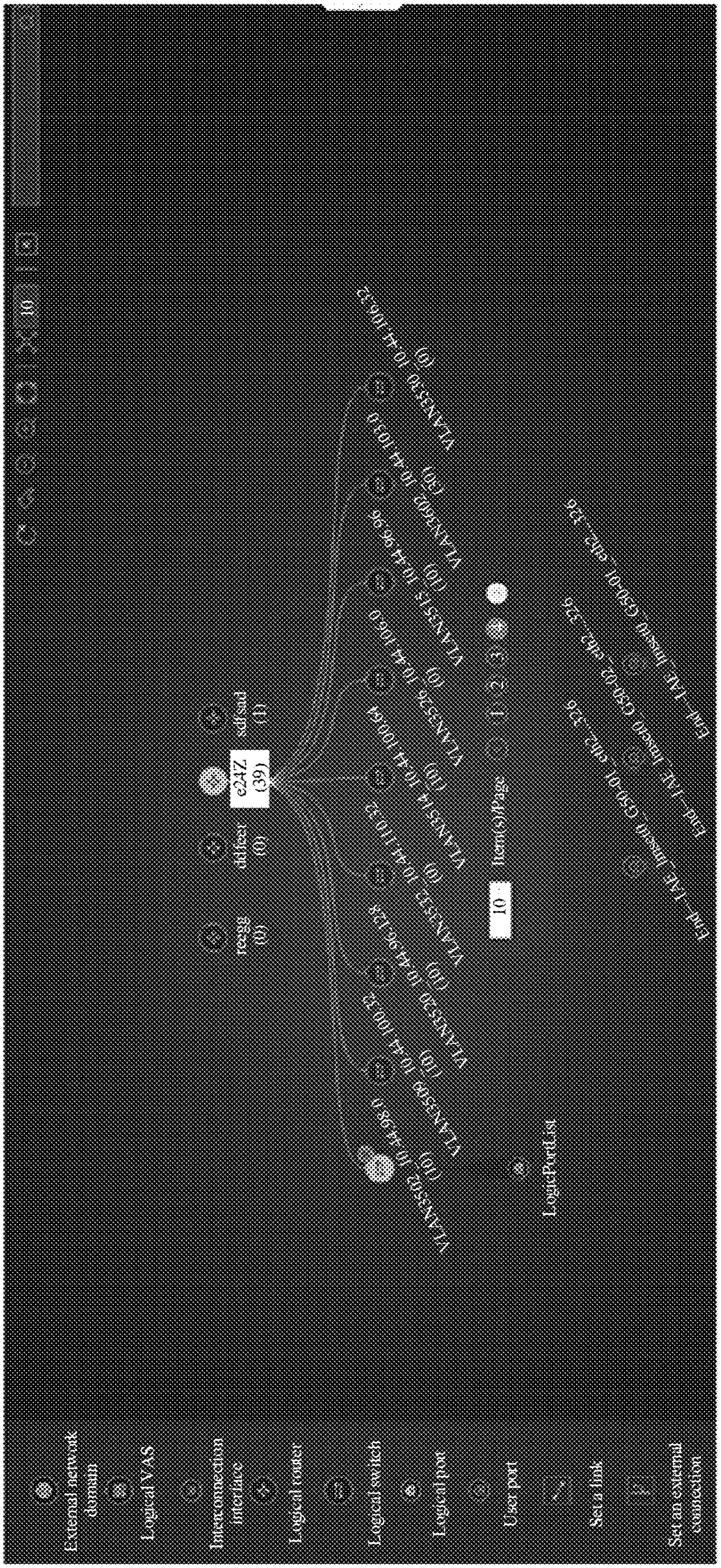
FIG. 19 is a schematic diagram of a display interface according to an embodiment of this application.

As shown in FIG. 16, an aggregation control and an aggregation granularity setting box are displayed in a second display area. A value of 5 is entered in the aggregation granularity setting box. In other words, the quantity threshold is 5. A node corresponding to VLAN3502_10.44.98.0 is selected. To be specific, a diagram element corresponding to the node corresponding to VLAN3502_10.44.98.0 is any diagram element in the any layer of topology structure. In this case, a lower layer of topology structure of the node corresponding to VLAN3502_10.44.98.0 is displayed. There are a relatively large quantity of nodes in the lower layer of topology structure. According to the method for displaying a topological structure diagram provided in this embodiment of this application, if a quantity of logical ports under a switch is greater than an aggregation value (namely, the quantity threshold, for example, 5 in FIG. 16), the server does not send information about the logical port and a user port corresponding to the logical port; or if a quantity of logical ports under a switch is less than or equal to an aggregation value, the server sends information about the logical port and a user port corresponding to the logical port. During rendering of a topology diagram, aggregated logical ports and user ports are displayed as one point on a page, and detailed information about the aggregated ports is displayed in a table on the page after an icon corresponding to the aggregation point is clicked. In this way, obtained data is reduced, and memory consumption and rendering pressure of the browser is reduced. For example, the quantity threshold is 5. There are more than 5 nodes in the lower layer of topology structure, and therefore the nodes are displayed in the aggregation manner. As shown in FIG. 17, nodes are displayed as one diagram element in an aggregation manner. An aggregation granularity can be customized, for example, set through a setting interface. This is not limited in this embodiment of this application. Similar to FIG. 16, FIG. 18 also displays an aggregation control and an aggregation granularity setting box in a second display area. For an interface shown in FIG. 18, an interface after aggregation is shown in FIG. 19.

In an example embodiment, after displaying the nodes in the any layer of topology structure in an aggregation manner, the method further includes: displaying information about aggregated nodes in the any layer of topology structure in a list form.

Figure 20:
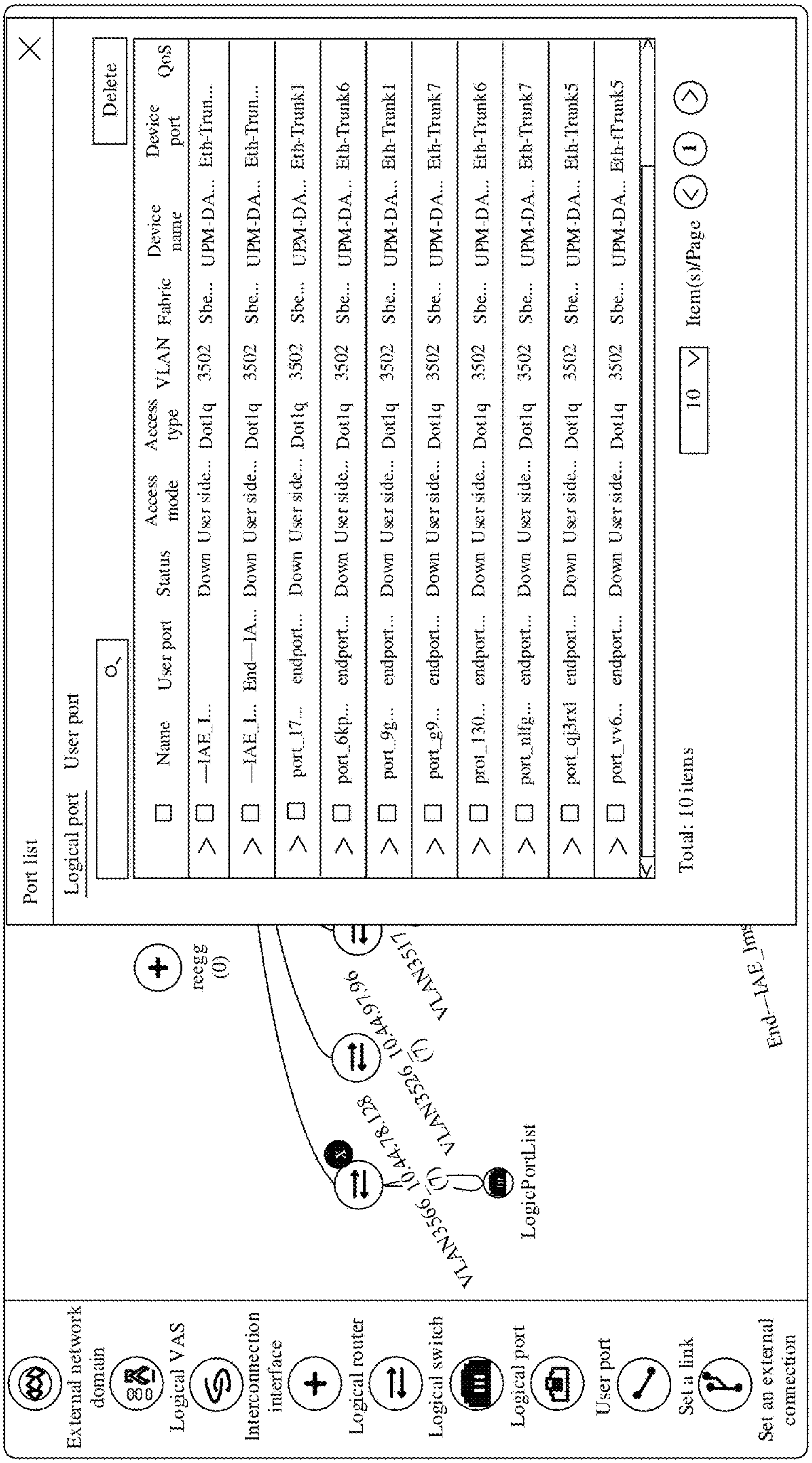
FIG. 20 is a schematic diagram of a display interface according to an embodiment of this application.
Figure 21:
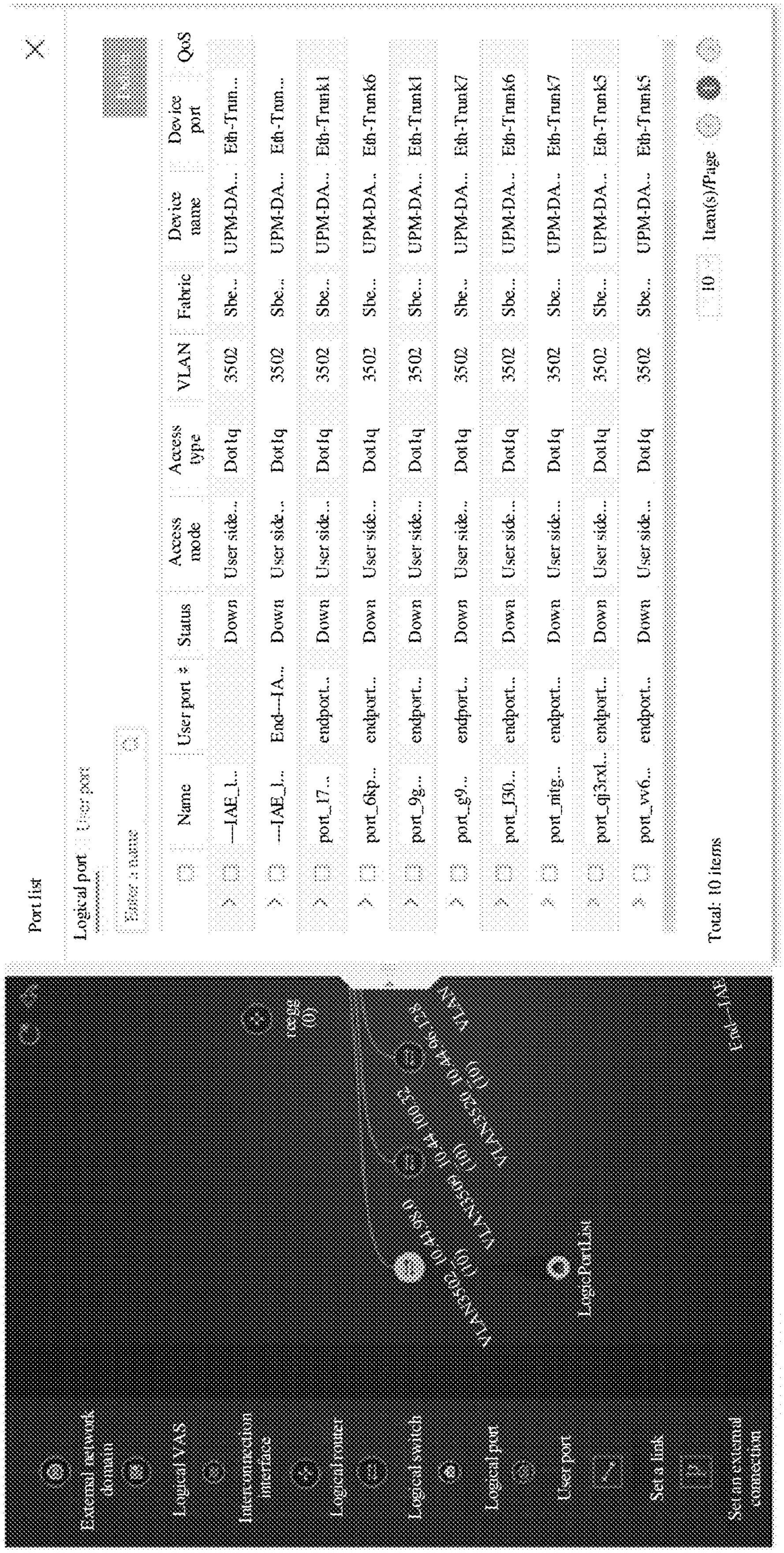
FIG. 21 is a schematic diagram of a display interface according to an embodiment of this application.

The information about the aggregated nodes, that is, information about nodes that has been aggregated, in any layer of topology structure is displayed in the list form. An interface after displaying in an aggregation manner in FIG. 17 is still used as an example. Information about each node in any layer of topology structure may be displayed in a list form shown in FIG. 20. It can be learned from FIG. 17 and FIG. 20 that, when the quantity of nodes in any layer of topology structure is greater than the quantity threshold, if the aggregation manner is used, a quantity of diagram elements that need to be displayed can be reduced, and rendering pressure can be reduced. Then, the information about the aggregated nodes is displayed in the list form. In this way, an information viewing requirement is further met. An interface after displaying in an aggregation manner in FIG. 19 is used as an example. Information about each node in any layer of topology structure may be displayed in a list form shown in FIG. 21.

In an example embodiment, after displaying the topological structure diagram in a display interface based on a classification result, the method further includes: displaying a thumbnail of the topological structure diagram. The thumbnail is used to display the entire topological structure diagram. When there is a large amount of data, a user can effectively learn of a full view of the entire topology. Therefore, information searching is facilitated.

Figure 22:
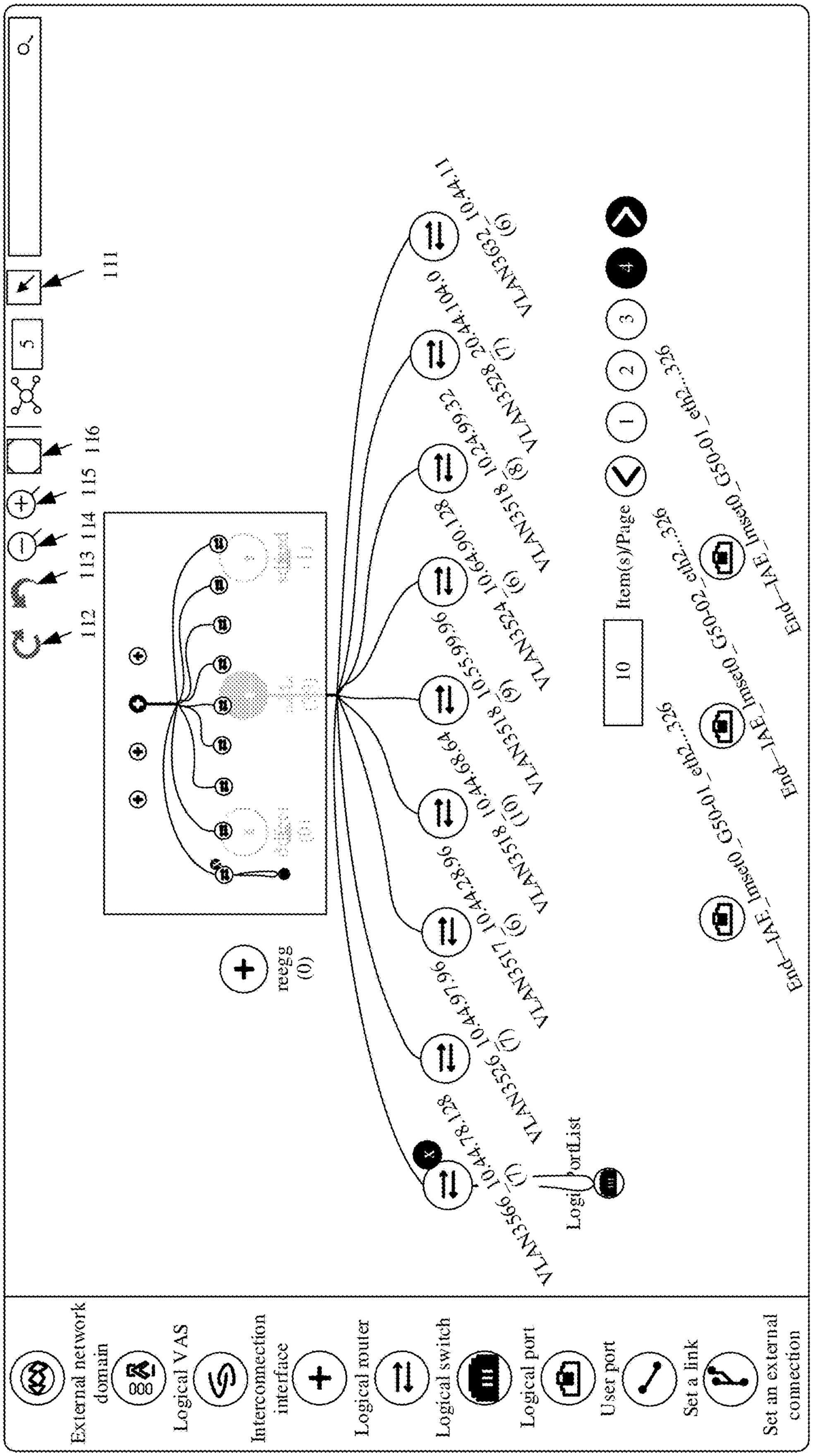
FIG. 22 is a schematic diagram of a display interface according to an embodiment of this application.
Figure 23:
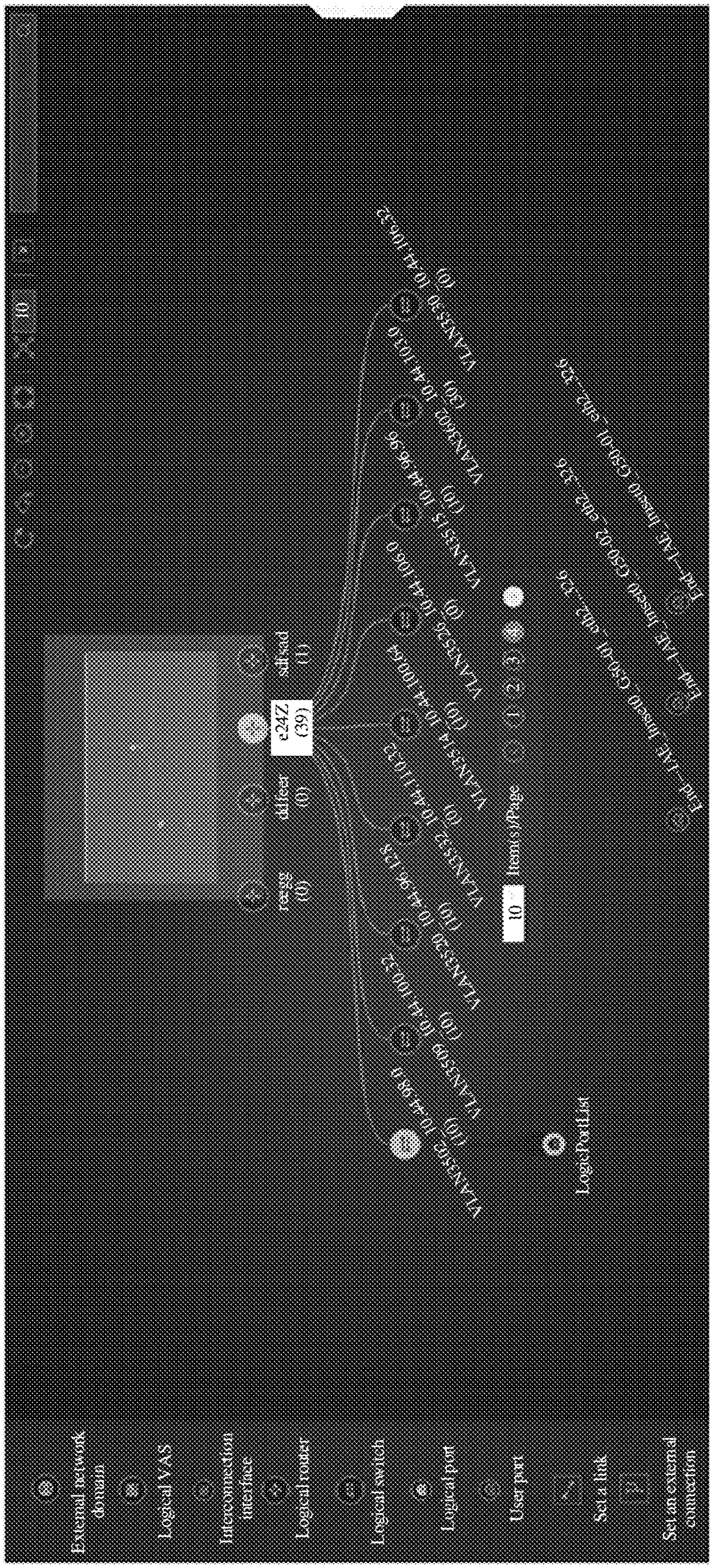
FIG. 23 is a schematic diagram of a display interface according to an embodiment of this application.

A display interface shown in FIG. 22 or FIG. 23 is used as an example. In this manner, not only the topological structure diagram can be normally displayed, but also a thumbnail of the topological structure diagram can be additionally displayed. Because the thumbnail has a relatively small area, it is convenient to select a node in the topological structure diagram. After any node is selected, a lower layer of topology structure of the selected node may be displayed, or another operation may be performed for the selected node.

It should be noted that an occasion for displaying the thumbnail of the topological structure diagram is not limited in this embodiment of this application, and the thumbnail of the topological structure diagram may be displayed at any time after the topological structure diagram is displayed in the display interface. For example, a control used to trigger displaying of the thumbnail of the topological structure diagram is displayed in the display interface, and the control is used to trigger displaying of the thumbnail of the topological structure diagram. For example, in the display interface shown in FIG. 22, a thumbnail control 111 is the control used to display the thumbnail of the topological structure diagram, and displaying of the thumbnail of the topological structure diagram may be triggered by clicking the thumbnail control 111. In an example embodiment, the displayed thumbnail of the topological structure diagram may be a thumbnail of a topological structure diagram currently displayed in a second display area. In other words, if the thumbnail control 111 is clicked, a thumbnail of a topological structure diagram that is currently displayed in the second display area is displayed.

It should be noted that for a case in which the topological structure diagram includes an isolated node, in a process such as displaying a thumbnail or displaying in an aggregation manner, a diagram element corresponding to the isolated node may always be displayed in the second display area, or may not be displayed. This is not limited in this embodiment of this application.

In addition, in the method provided in this embodiment of this application, in addition to displaying the thumbnail control 111, the display interface includes but is not limited to displaying one or more of the following controls. For example, a display interface shown in FIG. 22 is used as an example. Functions of controls are as follows:

A refresh control 112 is configured to refresh the topological structure diagram. For example, the refresh control 112 obtains updated topology information from the server, and refreshes the currently displayed topological structure diagram based on the updated topology information.

An undo control 113 is configured to cancel an edit operation on the topological structure diagram. For example, if the currently displayed topological structure diagram is being edited, a previous edit operation may be canceled by using the undo control 113.

A zoom-out control 114 is configured to zoom out the topological structure diagram. The currently displayed topological structure diagram may be zoomed out by using the zoom-out control 114. A zoom-out ratio may be set based on experience or an application scenario, or may be determined based on a quantity of times for selecting the zoom-out control 114. For example, each time the zoom-out control 114 is selected, the topological structure diagram is zoomed out by one time. For example, if the zoom-out control 114 is selected twice, the topological structure diagram is zoomed out by two times.

A zoom-in control 115 is configured to zoom in the topological structure diagram. The currently displayed topological structure diagram may be zoomed in by using the zoom-in control 115. A zoom-in ratio may be set based on experience or an application scenario, or may be determined based on a quantity of times for selecting the zoom-in control 115. For example, each time the zoom-in control 115 is selected, the topological structure diagram is zoomed in by one time. For example, if the zoom-in control 115 is selected twice, the topological structure diagram is zoomed in by two times.

A screen adaptation control 116 is configured to adaptively display the display interface based on a screen size. To be specific, the screen adaptation control 116 may be used to control the display interface to be displayed based on the screen size.

In an example embodiment, the method provided in this embodiment further includes: displaying a setting interface in the display interface, where the setting interface is used to set personalized settings for a diagram element displayed in the display interface.

In an example embodiment, the personalized settings include a diagram element spacing, a text length, and a text inclination.

Figure 24:
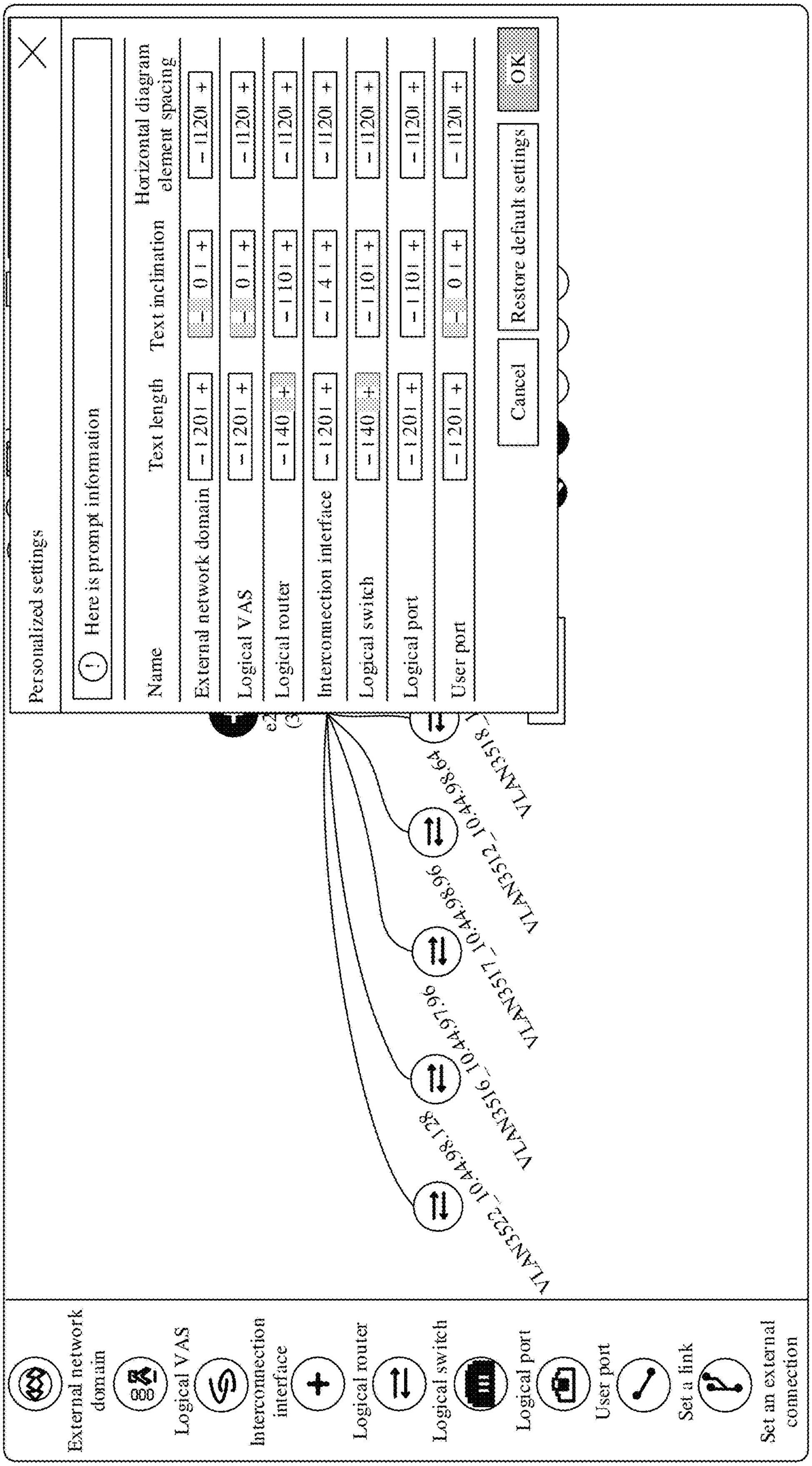
FIG. 24 is a schematic diagram of a display interface according to an embodiment of this application.
Figure 25:
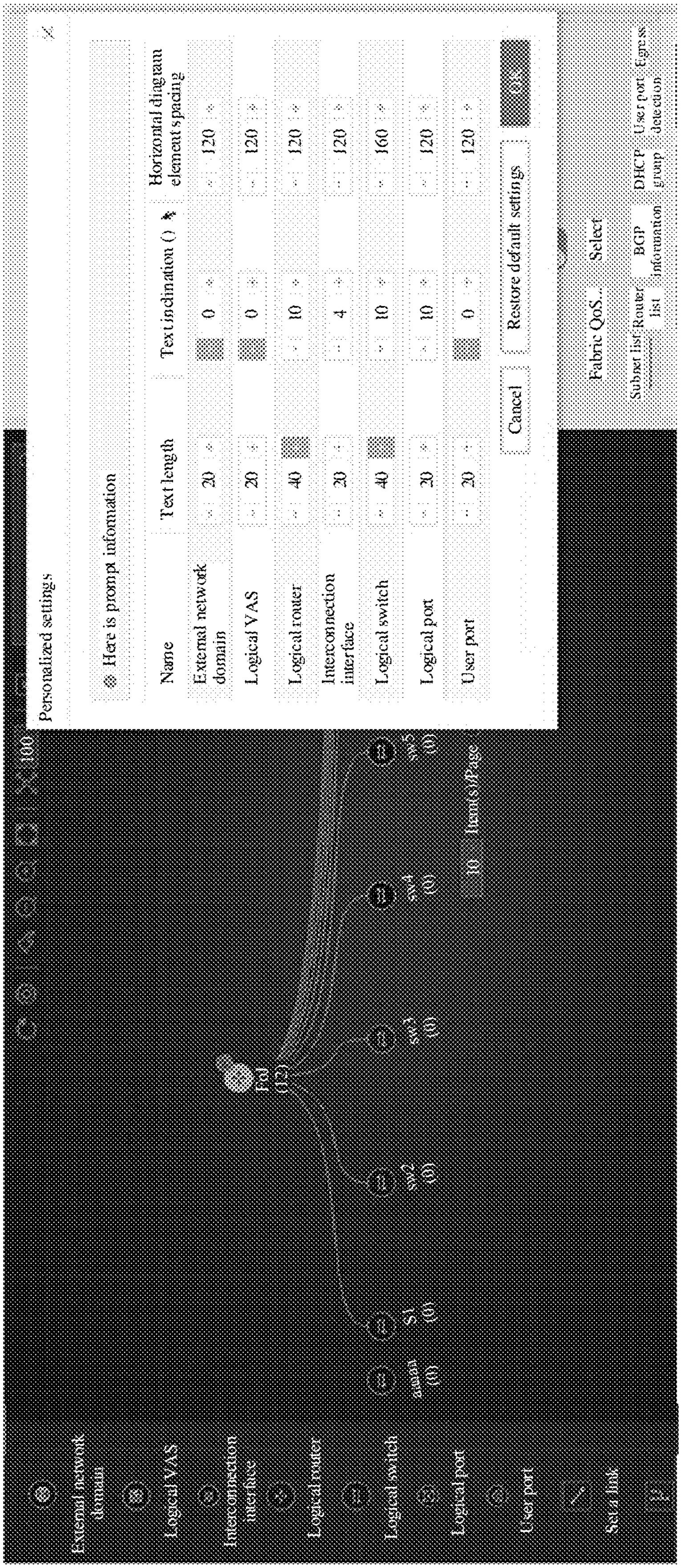
FIG. 25 is a schematic diagram of a display interface according to an embodiment of this application.

The personalized setting can enable the displayed topological structure diagram to meet a personalized requirement better. For example, a setting interface may be shown in FIG. 24 or FIG. 25. Personalized setting elements include the diagram element spacing, the text length, and the text inclination. A user can set these elements based on an actual condition. This improves operability and usability, and effectively improves user experience. In addition, regardless what personalized setting is set, based on the personalized setting, the setting interface provided in this embodiment of this application further includes two options: cancel and confirm. The cancel option is used to restore a value before the setting, and the confirm option is used to enable a current setting.

In an example embodiment, based on the personalized setting, the method provided in this embodiment of this application further supports restoring default settings. The default settings may be initial settings for the topological structure diagram, and the diagram element spacing, the text length, and the text inclination in the default settings are all initial values. An initial value set for each element in the default settings may be set based on experience, or may be set based on properties of different topological structure diagrams. This is not limited in this embodiment of this application.

Figure 26:
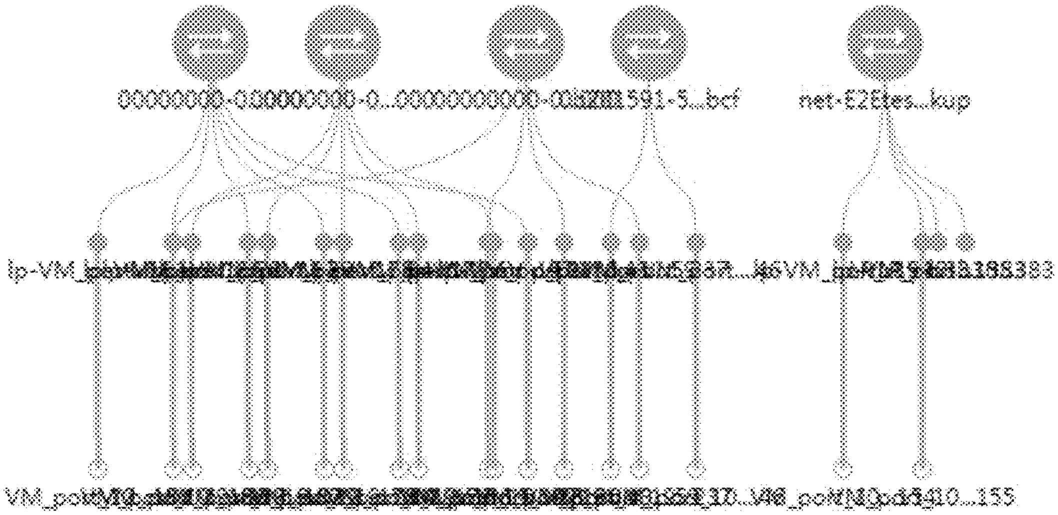
FIG. 26 is a schematic diagram of a related display interface according to an embodiment of this application.

Based on the foregoing descriptions of the method for displaying a topological structure diagram provided in this embodiment of this application, and with reference to a manner of displaying a topological structure diagram in the related technology shown in FIG. 26, it is easy to see that the topological structure diagram in FIG. 26 includes a large quantity of nodes, overlapping occurs on displayed nodes, and information is not displayed intuitively. Consequently, an operation is not facilitated. It is easy to see that, compared with the displaying manner in the related technology shown in FIG. 26, the method provided in this embodiment and any one of the displaying manners shown in FIG. 2 to FIG. 25 provided herein can make the topological structure diagram, even a complex topological structure diagram, organized and displayed in order. Information is displayed intuitively. This facilitates an operation, improves operability and usability, and facilitates management, and operation and maintenance.

Figure 27:
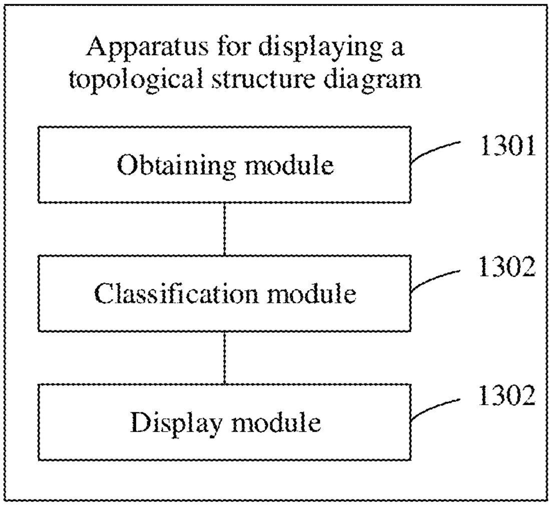
FIG. 27 is a schematic structural diagram of an apparatus for displaying a topological structure diagram according to an embodiment of this application.

As shown in FIG. 27, an embodiment of this application provides an apparatus for displaying a topological structure diagram. The apparatus is configured to perform the foregoing method for displaying a topological structure diagram. As shown in FIG. 27, the apparatus includes:

an obtaining module 1301, configured to obtain topology information of the topological structure diagram;

a classification module 1302, configured to classify the topology information based on node types in the topological structure diagram; and a display module 1303, configured to display the topological structure diagram in a display interface based on a classification result.

In an example embodiment, the display module 1303 is configured to: display a reference-quantity-layer topology structure in the display interface based on the classification result, and when any node in the (reference-quantity)$^{th}$ layer of topology structure is selected, continue to display a lower layer of topology structure of the selected node.

In an example embodiment, the display interface includes a first display area and a second display area; and a node used to construct a network topology diagram and a diagram element corresponding to a communications medium are displayed in the first display area.

The display module 1303 is configured to: display the reference-quantity-layer topology structure in the second display area based on the classification result, and when any node in the (reference-quantity)$^{th}$ layer of topology structure is selected, continue to display the lower layer of topology structure of the selected node; and when any diagram element in the first display area is selected, update, based on the selected diagram element, a topology structure displayed in the second display area.

In an example embodiment, the display interface includes a first display area and a second display area.

The display module 1303 is configured to: display, in the first display area, diagram elements corresponding to different types of nodes in the topological structure diagram; and after any diagram element in the first display area is selected, display, in the second display area based on a hierarchical relationship, a topology structure corresponding to a node type corresponding to the selected diagram element.

In an example embodiment, the display module 1303 is configured to: display, in the second display area based on the hierarchical relationship, the first layer of topology structure corresponding to a same type of node corresponding to the selected diagram element; and after any node in the first layer of topology structure is selected, continue to display a lower layer of topology structure of the selected node in the second display area.

In an example embodiment, the display module 1303 is configured to display the lower layer of topology structure of the selected node in a manner different from a manner for an unselected node.

In an example embodiment, the display module 1303 is further configured to hide a diagram element other than the selected node and an upper layer and a lower layer of topology structures of the selected node.

In an example embodiment, the display module 1303 is configured to: when a quantity of nodes in the lower layer of topology structure of the selected node is greater than a reference quantity, display the lower layer of topology structure of the selected node in the second display area in a pagination manner, and display a page switching control in the display interface; and switch a page by using the page switching control, where different pages display different nodes in the lower layer of structure of the selected node.

In an example embodiment, the display module 1303 is further configured to: display a control menu in the second display area, where the control menu displays an option used to indicate to display a diagram element related to the selected node; and hide the diagram element other than the selected node and the upper layer and the lower layer of topology structures of the selected node by using the option that is in the control menu and that is used to indicate to display the diagram element related to the selected node.

In an example embodiment, the display interface further displays a search box.

The display module 1303 is further configured to: obtain node information entered in the search box; and display, in the display interface, a topology structure in which a node corresponding to the node information is located.

In an example embodiment, the display module 1303 is further configured to: when a quantity of nodes in any layer of topology structure is greater than a quantity threshold, display the nodes in the any layer of topology structure in an aggregation manner.

In an example embodiment, the display module 1303 is further configured to display information about aggregated nodes in the any layer of topology structure in a list form.

In an example embodiment, the display module 1303 is configured to: display the topological structure diagram in the display interface based on the classification result, and display a thumbnail of the topological structure diagram.

In an example embodiment, the display module 1303 is further configured to display a setting interface in the display interface, where the setting interface is used to set personalized settings for a diagram element displayed in the display interface.

In an example embodiment, the personalized settings include a diagram element spacing, a text length, and a text inclination.

It should be understood that, when the apparatus provided in FIG. 27 implements functions of the apparatus, division into the foregoing functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatus provided in the foregoing embodiment and the method embodiments pertain to a same concept. For a specific implementation process of the apparatus, refer to the method embodiments. Details are not described herein again.

Figure 28:
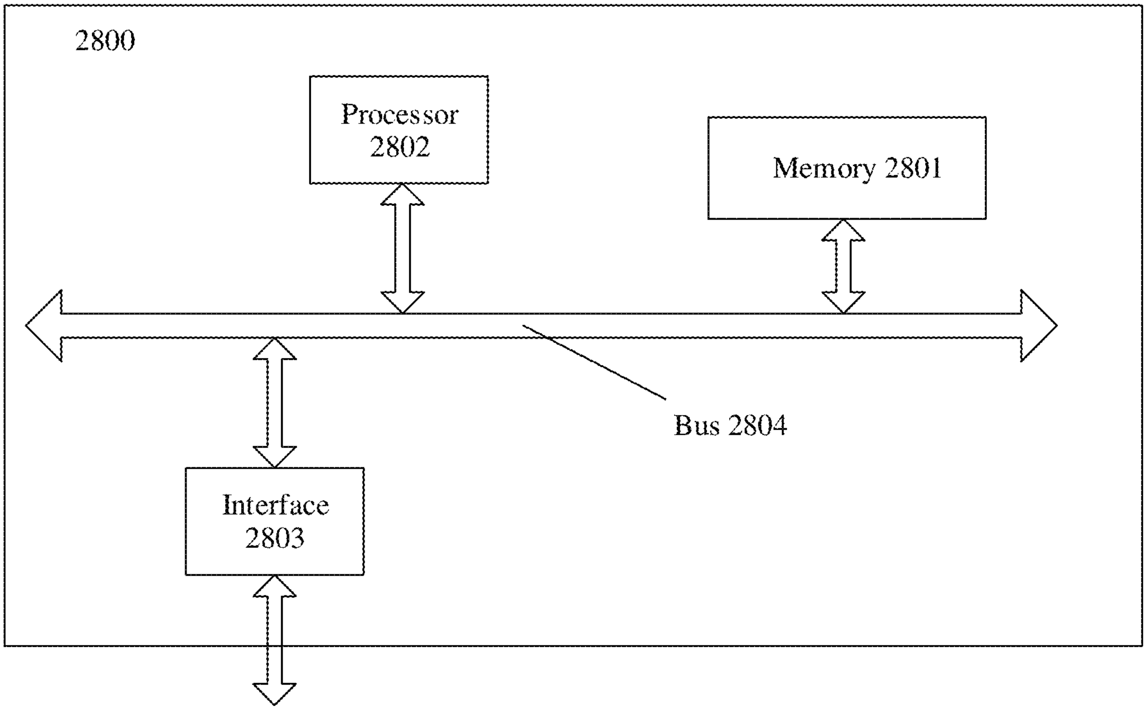
FIG. 28 is a schematic structural diagram of a device for displaying a topological structure diagram according to an embodiment of this application.

As shown in FIG. 28, an embodiment of this application further provides a device 2800 for displaying a topological structure diagram. The device 2800 for displaying a topological structure diagram shown in FIG. 28 is configured to perform operations in the foregoing method for displaying a topological structure diagram. The device 2800 for displaying a topological structure diagram includes a memory 2801, a processor 2802, and an interface 2803. The memory 2801, the processor 2802, and the interface 2803 are connected to each other by using a bus 2804.

The memory 2801 stores at least one instruction. The at least one instruction is loaded and executed by the processor 2802, to implement any one of the foregoing methods for displaying a topological structure diagram.

The interface 2803 is used for communication between the device 2800 for displaying a topological structure diagram and another device in a network. The interface 2803 may implement communication in a wireless or wired manner. For example, the interface 2803 may be a network adapter. For example, the device 2800 for displaying a topological structure diagram may communicate with a server through the interface 2803, to obtain topology information of a to-be-displayed network topology diagram.

It should be understood that FIG. 28 shows only a simplified design of the device 2800 for displaying a topological structure diagram. During actual application, the device for displaying a topological structure diagram may include any quantity of interfaces, processors, or memories. In addition, the processor may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing machines (advanced RISC machines, ARM) architecture.

Further, in an optional embodiment, the foregoing memory may include a read-only memory and a random access memory, and provide instructions and data for the processor. The memory may further include a nonvolatile random access memory. For example, the memory may further store information about a device type.

The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. For example but not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A computer-readable storage medium is further provided. The storage medium stores at least one instruction. The instruction is loaded and executed by a processor, to implement any one of the foregoing methods for displaying a topological structure diagram.

This application provides a computer program. When the computer program is executed by a computer, a processor or the computer may be enabled to perform corresponding operations and/or procedures in the foregoing method embodiments.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

The foregoing descriptions are merely the embodiments of this application, but are not intended to limit this application. Any modification, equivalent replacement, or improvement made without departing from the spirit and principle of this application should fall within the protection scope of this application.

What is claimed is:

1. A method for displaying a node diagram, comprising:

displaying the node diagram in a display interface wherein the node diagram comprises a plurality of nodes and each of the plurality of nodes corresponds to a network component, and the node diagram is organized by category of a plurality of categories, wherein the plurality of categories are based on node types;

wherein displaying the node diagram comprises:

when a quantity of lower-layer nodes connected to an upper-layer node is greater than a quantity threshold, displaying the lower-layer nodes in an aggregation manner;

wherein displaying the node diagram further comprises:

displaying an N-layer structure in the display interface, and when a node in the Nth layer of the N-layer structure is selected, displaying a lower-layer structure of the selected node, where N is a positive integer greater than or equal to 1; and wherein displaying the lower-layer structure of the selected node comprises:

hiding a diagram element other than the selected node, an upper-layer structure of the selected node and the lower-layer structure of the selected node.

2. The method according to claim 1, wherein displaying the lower-layer structure of the selected node comprises:

displaying the lower-layer structure of the selected node in a manner different from a manner for an unselected node.

3. The method according to claim 1, wherein displaying the lower-layer structure of the selected node comprises:

when a quantity of nodes in the lower-layer structure of the selected node is greater than a reference quantity, displaying the lower-layer structure of the selected node in a pagination manner, and displaying a page switching control in the display interface; and switching a page by using the page switching control, wherein different pages display different nodes in the lower-layer structure of the selected node.

4. The method according to claim 1, wherein the network component is a logical component or a physical component.

5. The method according to claim 4, wherein the logical component is a logical value added service (VAS), a logical router, a logical switch, or a logical port.

6. The method according to claim 1, wherein the network component is a physical component that is either an interconnection interface or a user port.

7. The method according to claim 1, wherein the method further comprises:

displaying information about the aggregated lower-layer nodes in a list form.

8. The method according to claim 1, wherein the display interface comprises a first display area and a second display area; and displaying the node diagram further comprises:

displaying, in the first display area, diagram elements corresponding to different types of nodes in the node diagram; and after a diagram element in the first display area is selected, displaying, in the second display area based on a hierarchical relationship, a logical structure corresponding to a node type corresponding to the selected diagram element.

9. A non-transitory computer readable storage medium comprising:

a non-transitory computer readable storage medium storing instructions that when executed by at least one processor instruct the at least one processor to:

display a node diagram in a display interface wherein the node diagram comprises a plurality of nodes and each of the plurality of nodes corresponds to a network component, and the node diagram is organized by category of a plurality of categories, and wherein the plurality of categories are based on node types;

wherein displaying the node diagram comprises:

when a quantity of lower-layer nodes connected to an upper-layer node is greater than a quantity threshold, displaying the lower-layer nodes in an aggregation manner;

wherein the instructions executed by the at least one processor further instruct the at least one processor to:

display an N-layer structure in the display interface, and when a node in the Nth layer of the N-layer structure is selected, displaying a lower-layer structure of the selected node, where N is a positive integer greater than or equal to 1; and wherein the instructions executed by the at least one processor further instruct the at least one processor to display the lower-layer structure of the selected node by hiding a diagram element other than the selected node, an upper-layer structure of the selected node and the lower-layer structure of the selected node.

10. The computer readable storage medium according to claim 9, wherein the instructions executed by the at least one processor further instruct the at least one processor to display the lower-layer structure of the selected node in a manner different from a manner for an unselected node.

11. The computer readable storage medium according to claim 9, wherein the instructions executed by the at least one processor further instruct the at least one processor to:

when a quantity of nodes in the lower-layer structure of the selected node is greater than a reference quantity, display the lower-layer structure of the selected node in the second display area in a pagination manner, and display a page switching control in the display interface; and switch a page by using the page switching control, wherein different pages display different nodes in the lower-layer structure of the selected node.

12. The computer readable storage medium according to claim 9, wherein the network component is a logical component or a physical component.

13. The computer readable storage medium according to claim 12, wherein the logical component is a logical value added service (VAS), a logical router, a logical switch, or a logical port.

14. The computer readable storage medium according to claim 9, wherein the network component is a physical component that is either an interconnection interface or a user port.

15. The computer readable storage medium according to claim 9, wherein the instructions executed by the at least one processor further cause the apparatus to:

display information about the aggregated lower-layer nodes in a list form.

16. The computer readable storage medium according to claim 9, wherein the display interface comprises a first display area and a second display area; and wherein the instructions executed by the at least one processor further instruct the at least one processor to:

display, in the first display area, diagram elements corresponding to different types of nodes in the node diagram; and after a diagram element in the first display area is selected, display, in the second display area based on a hierarchical relationship, a logical structure corresponding to a node type corresponding to the selected diagram element.

* * * * *